US011915367B2

(12) United States Patent
Goodsitt et al.

(10) Patent No.: US 11,915,367 B2
(45) Date of Patent: Feb. 27, 2024

(54) COMPUTER-BASED SYSTEMS CONFIGURED FOR TEXTURE WARPING-BASED ENCRYPTION AND METHODS OF USE THEREOF

(71) Applicant: Capital One Services, LLC, McLean, VA (US)

(72) Inventors: Jeremy Goodsitt, Champaign, IL (US); Reza Farivar, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 162 days.

(21) Appl. No.: 17/357,235

(22) Filed: Jun. 24, 2021

(65) Prior Publication Data
US 2022/0414978 A1 Dec. 29, 2022

(51) Int. Cl.
*G06T 17/00* (2006.01)
*G06K 19/06* (2006.01)
(Continued)

(52) U.S. Cl.
CPC ........ *G06T 17/00* (2013.01); *G06K 19/06037* (2013.01); *G06V 20/46* (2022.01);
(Continued)

(58) Field of Classification Search
CPC .. G06K 19/06037; G06T 17/00; G06V 20/46; G06V 20/647; G06V 2201/07; H04L 9/0825
See application file for complete search history.

(56) References Cited

U.S. PATENT DOCUMENTS 7,650,009 B2 * 1/2010 Rhoads ............... G06Q 20/341
382/100
8,442,221 B2 5/2013 Ming
(Continued)

FOREIGN PATENT DOCUMENTS

EP  2725567 A2 *  4/2014  ............... G09C 5/00

OTHER PUBLICATIONS

Jin et al., "Multi-level Chaotic Maps for 3D Textured Model Encryption", 2nd EAI International Conference on Robotic Sensor Networks, Aug. 25-26, 2018, Version 2: Nov. 5, 2020. https://arxiv.org/abs/1709.08364. (Year: 2020).*
(Continued)

*Primary Examiner* — Sing-Wai Wu
(74) *Attorney, Agent, or Firm* — Greenberg Traurig, LLP

(57) ABSTRACT

Systems and methods for providing encryption and decryption involving texture warping, comprising: obtaining a visual input; obtaining a private key; generating an encrypted visual representation (visual representation A) based on the private key and the visual input; determining at least one 3D object configured so that the private key is derivable when the visual representation A is mapped to a digital model of the at least one 3D object; transmitting the visual representation A to a second computing device associated with a second user; transmitting a representation of the digital model of the at least one 3D model to the second computing device; and instructing the second computing device so that the second computing device is configured to map the visual representation A to the digital model generated based on the representation of the digital model of the at least one 3D model to extract the private key.

19 Claims, 13 Drawing Sheets

(51) Int. Cl.
*G06V 20/40* (2022.01)
*G06V 20/64* (2022.01)
*H04L 9/08* (2006.01)

(52) U.S. Cl.
CPC .......... *G06V 20/647* (2022.01); *H04L 9/0825* (2013.01); *G06V 2201/07* (2022.01)

(56) References Cited

U.S. PATENT DOCUMENTS

| | | |
|---|---|---|
| 9,537,847 B2 | 1/2017 | Aissi et al. |
| 2003/0204731 A1 | 10/2003 | Pochuev et al. |
| 2013/0057644 A1 | 3/2013 | Stefanoski et al. |
| 2013/0111208 A1* | 5/2013 | Sabin ............... G06F 21/36 713/176 |
| 2015/0139535 A1* | 5/2015 | Siddiqui ............ G06V 10/772 382/154 |
| 2015/0278532 A1* | 10/2015 | Kunigita ............ H04N 21/4408 713/189 |
| 2020/0219221 A1 | 7/2020 | Malone |

OTHER PUBLICATIONS

Jolfaei et al., "A 3D object encryption scheme which maintains dimensional and spatial stability", IEEE Trans. Information Forensics and Security 10(2), 409-422, Feb. 2015. (Year: 2015).*

* cited by examiner

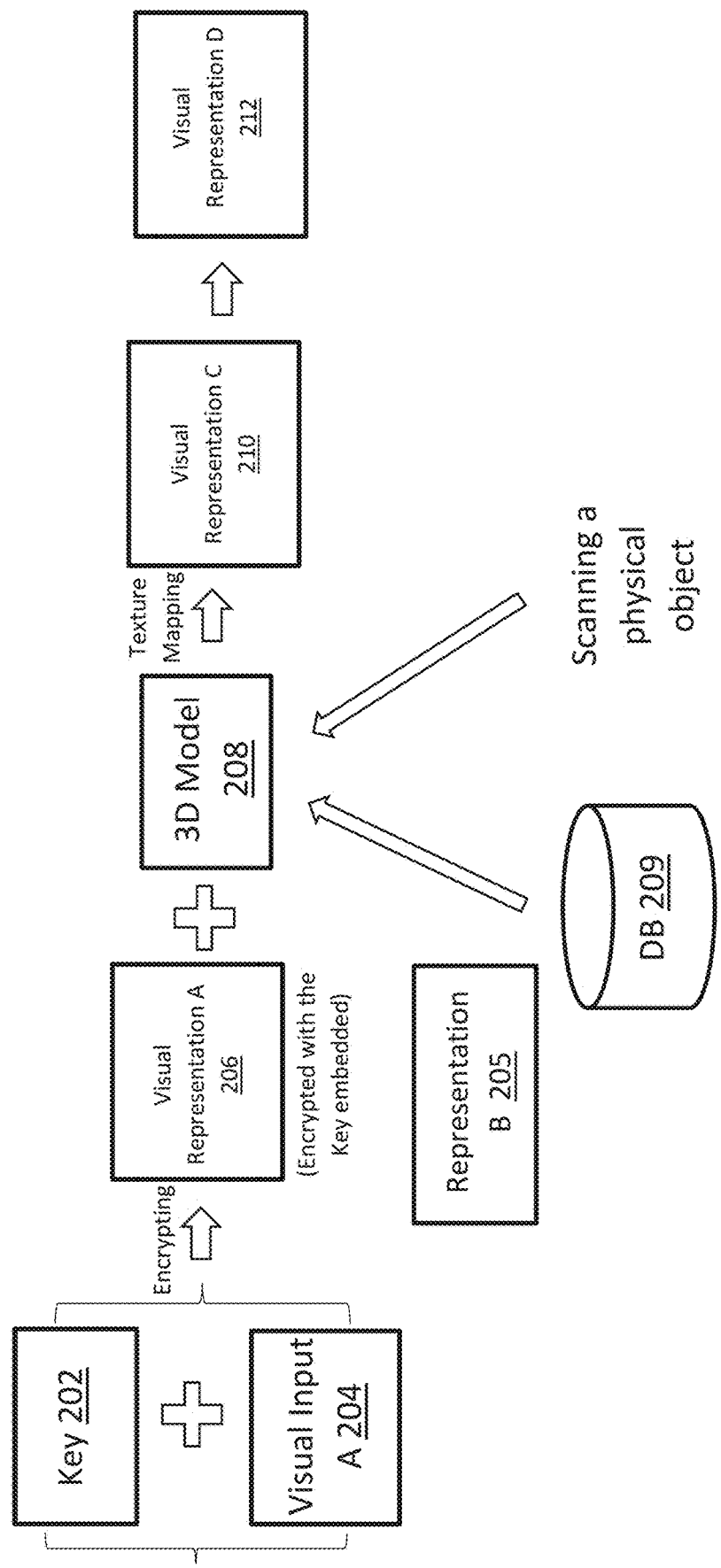

COMPUTER-BASED SYSTEMS CONFIGURED FOR TEXTURE WARPING-BASED ENCRYPTION AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices configured for one or more novel technological applications involving geometry-based (e.g., texture warping-based) encryption and decryption.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic data encryption, decryption, steganography (e.g., techniques to conceal a message in another message or physical object, etc.), transmission, processing, and/or service management involved with encryption, decryption, steganography, and/or associated secure data related activities and/or services.

SUMMARY OF DESCRIBED SUBJECT MATTER

In some embodiments, the present disclosure provides various exemplary technically improved computer-implemented methods involving provisions of post-transaction data and services associated with smart transaction card based payment transactions, the method comprising steps such as:
  obtaining, by a first computing device associated with a first user, a visual input (visual input A);
  obtaining, by the first computing device, a private key;
  generating, by the first computing device, an encrypted visual representation (visual representation A) based on the private key and the visual input A;
  determining, by the first computing device, based at least in part on the private key, at least one 3D object configured so that the private key is derivable when the visual representation A is mapped to a digital model of the at least one 3D object;
  transmitting, by the first computing device, the visual representation A to a second computing device associated with a second user;
  transmitting, by the first computing device, a representation of the digital model of the at least one 3D model to the second computing device; and
  instructing, by the first computing device, the second computing device so that the second computing device is configured to:
    receive the visual representation A;
    obtain the representation of the digital model of the at least one 3D model;
    map the visual representation A to the digital model generated based on the representation of the digital model of the at least one 3D model to extract the private key; and
    decode, based on the private key, the visual representation A to obtain the visual input A.

In some embodiments, the present disclosure provides various exemplary technically improved computer-implemented methods involving provisions of post-transaction data and services associated with smart transaction card based payment transactions, the method comprising steps such as:
  obtaining, by a first computing device, a representation of a digital model of at least one 3D object, the representation of a digital model of at least one 3D object uploaded by a second computing device;
  obtaining, by the first computing device, a visual input;
  generating, by the first computing device, a private key by mapping the visual input to the digital model generated based on the representation of the digital model of the at least one 3D object;
  encrypting, by the first computing device, data with the generated private key;
  transmitting, by the first computing device, the visual input and the encrypted data to the second computing device, wherein the second computing device is configured to:
  map the received visual input to the digital model of the at least one 3D model to extract the private key; and
  decode, based on the private key, the encrypted data.

In some embodiments, the present disclosure provides various exemplary technically improved computer-implemented methods involving provisions of post-transaction data and services associated with smart transaction card based payment transactions, the method comprising steps such as:
  obtaining, by a first computing device associated with a first user, a visual input (visual input A);
  obtaining, by the first computing device, a private key;
  generating, by the first computing device, an encrypted visual representation (visual representation A) based on the private key and the visual input A, wherein the visual representation A comprises the private key and an encrypted visual input A of the visual input A;
  obtaining, by the first computing device, a representation comprising a digital model of at least one 3D object (visual representation B);
  mapping, by the first computing device, the visual representation A and the encrypted private key onto the digital model of the at least one 3D object of the visual representation B to generate a visual representation comprising a 3D textured model of the at least one 3D object (visual representation C);
  generating, by the first computing device, a 2D visual representation of the visual representation C (visual representation D); and
  transmitting, by the first computing device, the visual representation D to a second computing device associated with a second user; wherein the second computing device is configured to:
    receive the visual representation D;

obtain the visual representation B;
map the visual representation D to the visual representation B to extract the visual representation A and the private key; and
decode, based on the private key, the visual representation A to obtain the visual input A.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2A is a block diagram illustrating an exemplary texture warping-based encryption, consistent with exemplary aspects of certain embodiments of the present disclosure.

DETAILED DESCRIPTION

Figure 1:
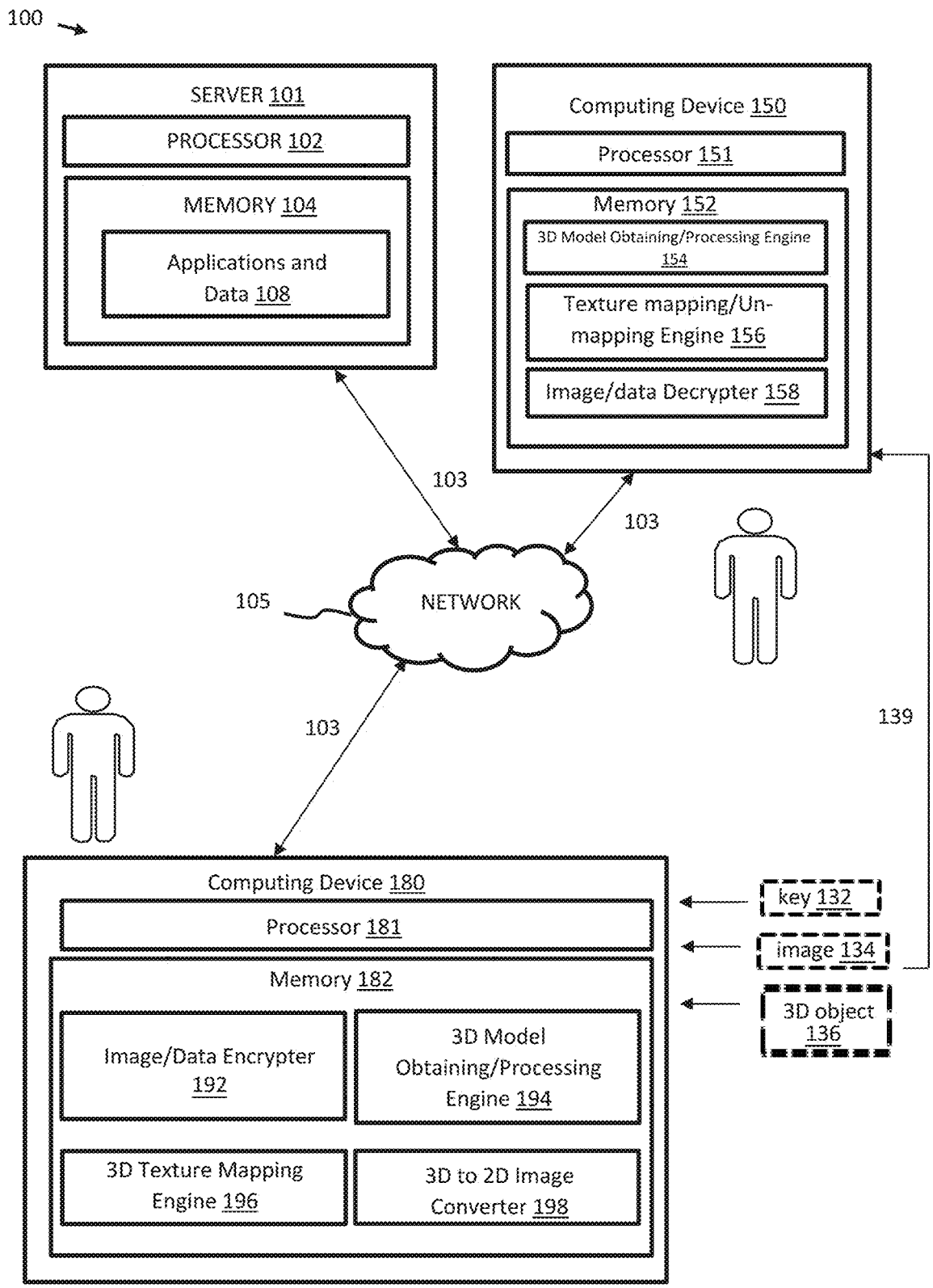
FIG. 1 is a block diagram of an exemplary system and/or platform involving features of texture warping-based encryption and/or decryption, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As explained in more detail, below, various exemplary computer-based systems and methods of the present disclosure allow for texture warping-based encryption/decryption associated with such as, but not limited to, encrypted one or more images or encrypted portions of one or more images. In one embodiment, an exemplary computer-implemented method of the present disclosure may include obtaining a three-dimensional (3D) model, texture mapping an image encrypted and embedded with a private key onto the 3D model, texture un-mapping a two-dimensional (2D) representation of the texture-mapped 3D model to extract the private key, and decrypting the encrypted image with the extracted private key to extract the image.

As used herein, in some embodiments, terms "texture warping" and "texture mapping" refer to computer graphic processes/techniques when an original 2D image (e.g., a texture map, image texture, etc.) is "wrapped around" or otherwise applied to a multi-dimensional object, such as, without limitations a 3D object (e.g., a 3D model, a contoured model, etc.) so as to acquire a surface texture similar to that of the 2D image on the multi-dimensional object. While the description herein provides examples related to 3D objects, any similarly suitable n-dimensional objects may be utilized. In other words, the original 2D image itself takes the form of (e.g., fitted, etc.) a 3D object and thus, a 2D representation of the textured 3D model becomes distorted uniquely by virtue of the geometry of the 3D object.

As used herein, in some embodiments, terms "texture unwarping" and "texture un-mapping" refer to computer graphic processes/techniques that reverse the effect of the texture mapping and warping such that the 2D image of, for example, the 3D model texture warped (e.g., an image distorted with the geometry of the 3D model, etc.) is un-mapped using the 3D model to restore or otherwise reconstruct the original 2D image. That is, with the unwarping process, the original 2D image is reconstructed via the removal of the various warping effects introduced therein by the texture mapping.

Various embodiments disclosed herein may be implemented in connection with one or more entities that provide, maintain, manage, or otherwise offer any services relating to data security (e.g., encryption and decryption) systems. In some embodiments, an exemplary entity may be a financial service entity that provides, maintains, manages, or otherwise offers financial services. Such financial service entity may be a bank, credit card issuer, or any other type of financial service entity that generates, provides, manages, and/or maintains financial service accounts that entail communicating data in a secured (e.g., encrypted) manner with one or more customers, third-party service providers, the data configured for use in association with, for example, authenticating the identities of account owners, providing one-time-passcodes, providing additional authentication factors for access to an associated financial service account. Financial service accounts may include, for example, credit card accounts, bank accounts such as checking and/or savings accounts, reward or loyalty program accounts, debit account, and/or any other type of financial service account known to those skilled in the art.

FIG. 1 depicts an exemplary computer-based system 100 illustrating aspects of texture warping-based encryption and decryption associated with the use of a transmitting user device and a receiving user device, in accordance with one or more embodiments of the present disclosure. System 100 may include at least one server 101, at least one receiving computing device 150, and at least one transmitting computing device 180, which may all communicate 103 over at least one communication network 105. Transmitting computing device 180 and receiving computing device 150 may be a wireless device, a desktop computer, a wearable device, an in-vehicle device, an Internet of Things (IoT) device, a smart transaction card, a transacting device such as a POS (point-of-sale, point-of-service, etc.) device, or other terminal or computer that processes encryption and/or decryption of data, as explained below. In various different embodiments, transmitting computing device 180 may implement all or portions of the functionality of the receiving computing device 150, and/or receiving computing device 150 may implement all or portions of the functionality of the transmitting computing device 180. Server 101 may also implement all or portions of the functionality associated with the transmitting computing device 180 and/or receiving computing device 150. For example, to attract more transactions, data communication, and render a more secure and satisfactory user experience, e.g. via system 100, a business or merchant associated with the system 100 have incentive and desire to enhance the transmitting computing device 180, receiving computing device 150, and/or server 101 to provide encryption and decryption of data for communication with enhanced security, at the transmitting computing device 180, receiving computing device 150, and/or server 101. Such a business or merchant may be a financial institution, such as a credit card company that has an account associated with a user, issued a transaction card to the user, provides services to a user. According to embodiments herein, implementations may relate to systems and methods whereby the transmitting computing device 180 can communicate with the receiving computing device 150 of users, server 101, and/or personal transacting devices (e.g., smart transaction cards, etc.) (not shown) of the users; and the receiving computing device 150 can also communicate with the server 101, and/or personal transacting devices of the users. In some implementations, the transmitting computing device 180 may communicate directly with the receiving computing device 150 leveraging technologies such as Bluetooth, near field communication (NFC), and other similarly suitable communication technologies.

The exemplary system of FIG. 1 may include an exemplary receiving computing device 150 (or other computing device(s) consistent therewith), associated with at least one receiving user, as well as an exemplary transmitting computing device 180 associated with at least one transmitting user. In some embodiments, the exemplary receiving computing device 150 may receive, and, in turn, decrypt data sent from and encrypted by the exemplary transmitting computing device 180. In some embodiments, the transmitting computing device 180 may reside on the server 101 and, therefore, the receiving computing device 150 may receive and decrypt data sent from and encrypted by the server 101. In other embodiments, the server 101 may be configured to receive or otherwise access information pertinent to the encryption of data to be communicated to the receiving computing device 150, and, in turn, process and transmit the encrypted data to the receiving computing device 150. The server 101 may also be configured to receive or otherwise access information pertinent to the decryption of the data for communication to the receiving computing device, and in turn process and transmit the decrypted or partially decrypted data to the receiving computing device 150. The following illustrates embodiments consistent with certain features and functionality associated with the texture warping-based encryption and/or decryption of data using the simplified example where the entire encryption is performed on the transmitting computing device 180 and the entire decryption is performed on the receiving computing device 150.

Transmitting computing device 180, such as a personal computer, a smart phone or other portable or wireless or wearable electronic device, may include computing device circuitry. Computing device circuitry may include a computing device processor 181, memory 182 such as RAM, computer-readable media, communication circuitry and/or interface(s), and/or any input and/or output device, such as a monitor, touchscreen and/or contactless display, and the like. The memory 182 may store code that, when executed by processor 181, may cause processor 181 to implement one or more aspects of various texture warping-based encryption schemes herein. In some embodiments, for example, such scheme(s) may involve at least one of: (1) an image/data encrypter 192, (2) a 3D model obtaining/processing engine 194, (3) a 3D texture mapping engine 196; and (4) a 3D to 2D image converter 198, to encrypt data (e.g., images, frames of videos, hologram, etc.) for communication to the receiving computing device 150. Computing device 180 may also display various graphical user interfaces that may be utilized to implement, configure and/or manage various texture warping-based encrypting features herein. In some embodiments, an application running on transmitting computing device 180, such as an application supplied by the entity maintaining a bank account, issuing a transaction card/smart transaction card, and/or otherwise managing/utilizing secure data communication, may include various modules that may transmit information to the receiving computing device 150, relay information back to the entity (e.g., server 101), and/or communicate with other computing components.

As shown in FIG. 1, the receiving computing device 150 may include computing device circuitry. Receiving computing device circuitry may include a computing device processor 151, memory 152 such as RAM, computer-readable media, communication circuitry and interface, and/or any input and/or output device, such as a touchscreen display. The memory 152 may store code that, when executed by processor 151, may cause processor 151 to implement one or more aspects of various texture unwarping-based decryption schemes herein, including those involving at least one of: (1) a 3D model obtaining/processing engine 154, (2) a texture mapping/un-mapping engine 156, and (3) an image/data decrypter 158, to decrypt data (e.g., images, frames of videos, hologram, etc.) received from the transmitting computing device 180. Computing device 150 may also display various graphical user interfaces that the owner may utilize to implement, configure and/or manage various texture unwarping-based decrypting features herein.

In this illustrated example embodiment, the transmitting computing device 180 may be configured to obtain a key 132 and an original image 134 (e.g., an input image, etc.), both of which are provided to the image/data encrypter 192 such that the original image 134 is encrypted with the key 132 to generate an output encrypted image. As shown herein, the transmitting computing device 180 and the receiving computing device 150 may be configured to utilize the respective 3D model obtainer (e.g., the 3D model obtaining/processing engine 194, the 3D model obtaining/processing engine 154, etc.) to obtain a 3D model representing a 3D object 136. The 3D model may be utilized for texture mapping and un-mapping using the encrypted image that is also embedded with the key 132. In implementations, the 3D object 136 may be transferred 139 or otherwise made available to the receiving computing device 150. In one example, the 3D object 136 may be a physical object and couriered from the user associated with the transmitting computing device 180 to the user associated with the receiving computing device 150. In another example, the 3D object 136 may be a digital 3D model or a representation thereof, which may be transmitted from the user associated with the transmitting computing device 180 to the user associated with the receiving computing device 150 via any suitable communication channels such as an email message, an a SMS message, MMS message, a social media message, communicated to (e.g., via Bluetooth, Wi-Fi, cellular, other shared or pairing services or protocols, etc.) a memo application, photo application, notification center, and the like. In one example, the 3D model of the 3D object 136 may be 3D printed into a physical object for transferal. In yet another example, the 3D object 136 may comprise, instead of a physical 3D object or a digital 3D model itself, information pertinent to retrieve, construct, or otherwise access at least a portion of a physical 3D object and/or at least a portion of a digital model of the 3D object for use to texture map the encrypted image including the key 132. Details with regard to the image/data encrypter 192, the 3D model obtaining/processing engine 194, the 3D texture mapping engine 196, the 3D to 2D image converter 198, the 3D model obtaining/processing engine 154, the texture mapping/un-mapping engine 156, and the image/data decrypter 158 will be described in connection with FIGS. 2A-4C, below.

Referring still to FIG. 1, server 101 may include at least one processor 102, a memory 104, such as random-access memory (RAM), and other applications and data 108. In some embodiments, server 101 may be operated by the entity issuing a smart transaction card, maintaining a bank account, by a merchant, a content provider, and/or by any service providing entity involved with secure data communications. Various embodiments herein may be configured such that the applications and data 108 may provide all or portions of the features and functionality associated with texture warping-based encryption and/or decryption of data, in conjunction with or independent of the features and functionality implemented at the transmitting computing device 180 and/or the receiving computing device 150.

In some embodiments, server(s) 101 may be associated with one or more entities that are stakeholders to service accounts of users, card transactions at transacting devices, such as the business or merchant, one or more financial services providers, such as an issuer of a credit card, debit card, or other transacting devices associated with secured data communication.

In some embodiments, a personal transacting device (not shown here, e.g., a transaction card including a traditional credit card, debit card, gift card, loyalty card, or a smart transaction card a smart transaction card such as a dynamic transaction card (e.g., a card detailed in U.S. Pat. No. 10,402,818 B2 assigned to Capital One Service LLC), RFID card, and/or any of a variety of other similarly suitable chip card may be utilized in connection with one or both of the encryption and decryption of data communicated between the transmitting computing device 180, the receiving computing device 150, and the server 101. In some embodiments, the personal transacting device may be configured independently as a data encrypting device and/or a data decrypting device, independently or in conjunction with one or both of the transmitting computing device 180, the receiving computing device 150, and the server 101. Such a personal transacting device may be configured with on-card circuitry, which may be implemented as one or more integrated circuit chips, and/or electronic devices, electrically interconnected and bonded to one or more circuit boards, according to one or more examples of the various embodiments herein.

Various embodiments associated with FIG. 1 and related disclosure herein solve a technical problem of encrypting and decrypting data such as images in a secure, and computationally resource-efficient manner. Various embodiments may be implemented based on features and functionality including encrypting an original image with a private key, obtaining a 3D model and/or pertinent information associated with the 3D model (e.g., information that may be used to retrieve, generate or otherwise access the 3D model), texture mapping the encrypted image including the key onto the 3D model, converting such textured 3D model into a 2D representation, texture un-mapping the 2D representation of the textured 3D model using the 3D model to extract the encrypted image and the key, and decrypting the encrypted image with the key to retrieve the original image. Various features and functionality disclosed herein may be utilized in connection with improved computing device (e.g., transmitting computing device 180, receiving computing device 150, server 101, etc.) functionality that involves data encryption and/or decryption, communication between computing devices (e.g., transmitting computing device 180, receiving computing device 150, server 101, etc.) with heightened security measures leveraging 3D objects/models' innate complexity in terms geometrics, and/or the highly private nature associated with their possession, configuration, and/or transmission between users, users and service providers, and various computing terminals and platforms. In some implementations, information pertinent to encrypting/decrypting data may be stored on a smart personal transacting device (e.g., smartphone, smart device, smart transaction card, etc.) for furnishing an additional layer of security in applying texture warping-based encryption/decryption. For instance, a personal transacting device may be configured to store information such as a digital 3D model, information for retrieving the 3D model from a source, the key or portions of the key, and so on.

In some embodiments, an initial authentication for pairing personal transacting devices (e.g., smart transaction cards, etc.) with the transmitting computing device 180 and/or the receiving computing device 150 may be implemented by the respective users contacting the entities from the respective users' computing devices to initially authorize the pairing of their respective smart transaction cards with transmitting computing device 180 and/or receiving computing device 150, respectively, so as to receive respective pairing approval. In other embodiments, the pairing and/or unpair processes between the smart transaction cards and the transmitting computing device 180 and/or receiving computing device 150, may occur automatically and seamlessly such as without any action on the part of the users, particularly if the computing device had been previously paired with the same smart transaction card in the past. In yet other embodiments, proximity MFA may use biometrics (e.g., fingerprint, voice recognition, etc.) and/or a password entered by the respective user and/or a swiping of the computing device screen by a finger of the respective user and/or the proximity of the smart transaction card to the computing device or any client device, for example, to respectively pair or unpair the smart transaction card with the transmitting computing device 180 and/or receiving computing device 150, or other clients.

While only one server 101, transmitting computing device 180, network 105, and receiving computing device 150 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Transmitting computing device 180, receiving computing device 150, and server 101 may be one or more computing devices configured to perform operations consistent with executing texture warping-based encryption/decryption of data.

FIG. 2A is a diagram illustrating an exemplary simplified texture warping-based encryption of an image, consistent with exemplary aspects of certain embodiments of the present disclosure. In this illustrated embodiment, an encryption key 202 and a visual input A 204 may be obtained by a computing device (not shown) associated with a first user. The computing device associated with the first user may comprise the transmitting computing device 180 of FIG. 1, or any computing devices suitable for performing texture warping-based encryption. The visual input A 204 may include one or more images, each of which may be any image type and may be encoded with various techniques known or to be developed by those skilled in the art. For example, the visual input A 204 may be an image that is compressed, uncompressed, color, black and white, gray scale, and so on. The visual input A 204 may also include a portion of another visual input such as an image, and/or a frame of a video. Although only one visual input A 204 is shown herein, the visual input A 204 may comprise multiple visual inputs such as multiple images, multiple portions of a same image or multiple images, as well as multiple frames from a same video or multiple videos. Furthermore, the visual input A 204 may be stored in computer memory of the computing device of the first user, and/or transmitted over a computer network via such computing device.

The encryption key 202 may be any key type, key format, and generated or otherwise configured using various techniques. For example, the encryption key 202 may comprise a series of one or more alphanumerical characters, a symbol, an image, and so on. The encryption key 202 may comprise a symmetric key, asymmetric key, public key, private key, and the like. The encryption key 202 may also be a private key encrypted with a public key known or otherwise accessible to both the first user (e.g., the encrypting user) and a second user (e.g., the decrypting and receiving user). In one example, the encryption key 202 may also be a composite key comprising one or more keys of respective types and values.

In various embodiments, the computing device of the first user may be configured to obtain the encryption key 202 and/or the visual input A 204 in any manner and/or from any sources. With regard to the encryption key 202, by ways of non-limiting examples, the computing device may obtain the encryption key 202 from a storage local to the computing device, a networked storage in communication with the computing device, and the like. In some embodiments, the computing device may be configured to first obtain information pertinent to, such as, where/how to obtain the encryption key 202, instead of the key itself. In some embodiments, the computing device may be configured to obtain parts of the encryption key 202 from one or more sources for re-construction into the whole key. In some implementations, the computing device may also be configured to generate the encryption key 202 for use in connection with texture warping-based encryption. Such key 202 may be generated via various techniques and/or algorithms such as, for example, AES cipher, DES cipher, using software, firmware, hardware, a combination thereof, and the like. With regard to the visual input A 204, according to one or more non-limiting examples herein, the computing device may be configured to obtain the visual input A 204 from a storage local to the computing device, a networked storage in communication with the computing device, a camera, scanning a physical print/document into a digital image, and the like.

In this illustrated example, the visual input A 204 may be encrypted using the encryption key 202 and embedded with the encryption key 202. Various encryption and embedding techniques may be utilized to generate an encrypted visual input A comprising the encryption key 202. For example, the visual input A may be encrypted with the key 202 first, and in turn, the visual input A is embedded with the encryption key 202 to generate a visual representation A for texture warping.

According to various embodiments of the disclosure, the visual input A may be encrypted with the encryption key 202 by, for example, the encrypter 192 of FIG. 1. The encrypter 192 may be configured to perform image encryption via various techniques/algorithms such as position permutation (transposition) based algorithms, value transformation (substitution) based algorithms, position-substitution based algorithms, and the like. The encrypter 192 may also be configured to encrypt the visual input A 204 with the encryption key 202 using software (e.g., software tool executing on the computing device of the first user or on a server, a cloud), firmware, hardware, a combination thereof, and the like. For example, the encrypter 192 may be a cryptography software of Microsoft BitLocker, VeraCrypt, FileVault, Tor, Folder Lock, Boxcryptor, AWS certificate manager, Endpoint Encryption, ESET, Letsencrypt, CryptaPix, Helicon, WinTrezur, and the like.

According to various aspects of the disclosure, the encrypted visual input A may be further processed to embed the encryption key 202 into the encrypted image to generate a visual representation A 206. Similarly, any suitable techniques and/or algorithms may be utilized to include the encryption key 202 into the encrypted visual input A via software, firmware, hardware, a combination thereof, and the like. Although not shown in FIG. 1, an image steganography module may be configured at the transmitting device 180 (e.g., the computing device of the first user) for including information and data inside the encrypted visual input A. For example, the image steganography module may be configured to implement spatial domain techniques such as the application of the least significant bit, the least significant bit replacement, the least significant bit matching, optimal pixel adjustment, pixel value differencing, and the like. The image steganography module may also be configured to implement transform domain techniques such as the application of discrete cosine transform, Fourier transform, wavelet transform, contourlet transform, and the like. By ways of non-limiting examples, the image steganography module may be a software tool of Xiao Steganography, Steghide, Crypture, rSteg, S Suite Picsel, Camouflage, OpenStego, and the like.

Subsequently, the visual representation A 206 may be texture mapped onto a digital model 208 of a 3D object to generate a visual representation C 210 of a 3D model textured of the visual representation A 206. According to some aspects, the digital model 208 of a 3D object may be obtained in various way. As illustrated herein, a representation 205 of the digital model 208 may be retrieved from a data storage 209, which may be configured to store one or more representations of digital models previously generated or otherwise established. The data storage 209 may be local to the computing device of the first user such that the representation 205 of the digital model 208 has been generated or downloaded for storing on the computing device, and the like. The data storage 209 may also be remote to the computing device of the user such that representation 205 of the digital model 208 may be downloaded or otherwise retrieved from sources other than the computing device itself (e.g., a server, a cloud service, another user's computing device, etc.) for the purpose of performing texture mapping. In some examples, the representation 205 of the digital model 208 obtained from a remote source may be stored locally at the computing device of the first user for future usage. In other examples, the representation 205 of the digital model 208 obtained from a remote source may be a restricted and/or limited-use (e.g., one time use only, etc.) digital model, which may not be stored locally, or be destructed after a configured number of uses in connection with texture warping-based encryption.

Various embodiments herein may be configured such that the representation 205 of the digital model 208 may be of various other suitable type, format, and the like. For example, the representation 205 may include a mathematical coordinate-based representation of one or more surfaces of the 3D object in three dimensions. In implementations, the 3D model 208 may be represented by a polygonal model, a curve model, and/or a digital sculpted model. As a polygonal model, the digital model 208 may be a collection of points in 3D space, in which the points are connected by line segments to form a polygonal mesh. As a curve model, the digital model 208 may be a collection of surfaces defined by curves, which are further influenced by weighted control points. The curves may be implemented in the form of nonuniform rational B-spline (NURBS), splines, patches, geometric primitives, and the like. As a digital sculpted model, the digital model 208 may be a dense model generated via the technique of displacement sculpting, a collection of voxels via the technique of volumetric sculpting, a collection of surfaces divided in triangulation via the technique of dynamic tessellation sculpting, and the like.

The 3D model 208 may be generated manually, using computer graphics hardware, firmware, software, or a combination thereof via various techniques. In some embodiments, the 3D model obtaining/processing engine 194 of FIG. 1 may be configured to obtain the 3D model 208. By ways of non-limiting examples, the 3D model obtaining/processing engine 194 may comprise computer graphics software applications and/or components such as AutoCAD, Cinema 4D, Autodesk Maya, 3D Slash, Max, Blender, LightWave, Modo, Shaper, Lofter, RealityCapture, Metashape, 3DF Zephyr, and Meshroom. MeshLab, GigaMesh Software Framework, MeshMixer, and so on. In various implementations, the digital model 208 generated may be of a corresponding file format such as, e.g., MD5, 3MF, BLEND, BMD3, BDL4, FBX, JA, LWO, MA, MAX, R3D, USD, X3D, and the like. In some embodiments, the 3D model 208 may be rendered to generate a visual representation B on a graphical user interface (GUI) for displaying to the first user associated with the computing device.

In some embodiments, the 3D model 208 also may be generated via the 3D model obtaining/processing engine 194 using photogrammetry that creates models using algorithms to interpret the shape and texture of real-world 3D objects based on photographs taken from multiple angles of the physical 3D object or a video recording such multiple images of the physical 3D object. As shown in this illustrated example, a physical 3D object may be photographed (e.g., scanned, etc.) using the computing device of the first user to create a plurality of images (e.g., overlapping, etc.) of the physical 3D object. In turn, the plurality of images may be provided to a 3D scanning application executing on the computing device (e.g., or a 3D service executing on a remote server, cloud, etc.) to process these images into the 3D model 208.

With regard to the aspect of texture mapping the visual representation A 206 and the encryption key 202 onto the 3D model 208, any suitable techniques may be utilized to perform the texture mapping to generate the visual representation C 210 of the 3D model texture warped with the visual representation A 206. In various embodiments, the 3D texture mapping engine 196 of FIG. 1 may be configured to text warp the visual representation A 206 and the encryption key 202 onto the 3D model 208. By ways of non-limiting examples, the 3D texture mapping engine 196 may be configured to implement texture mapping via the techniques such as diffuse mapping, multitexturing, mipmaps, height mapping, bump mapping, normal mapping, displacement mapping, reflection mapping, specular mapping, occlusion mapping, solid (procedural) mapping, and/or other variations thereof. Here, the visual representation A 206 embedded with the encryption key 202 may be treated as a texture map, which is applied to one or more surfaces in 3D space (e.g., the 3D geometrics of the 3D model). In some embodiments, upon mapping the visual representation A 206 to the 3D model, the key embedded in the visual representation A 206 is also mapped and therefore distorted onto the geometry of the 3D model. Here, since the texture map (e.g., the visual representation A 206) is not meant to apply texture in the sense of making the 3D model more realistic looking (e.g., surface color texturing, surface illumination texturing, etc.), the visual representation A 206 may be mapped to the 3D model in multiple ways (e.g., upside down, with an arbitrary rotation, etc.). For example, one or more surfaces of the 3D model 208 may be determined as having more complex (e.g., difficult to decipher or emulate) curvatures for mapping the key embedded in the visual representation A 206. As such, the key may be segmented into multiple portions, each in turn mapped to the specifically identified surfaces of the 3D model to generate a distorted version of visual representation A 206. The key may also be mapped as a whole to a specifically identified surface of the 3D model as well.

As shown in this illustrated example, the visual representation C 210 is further rendered to convert a 3D representation of the 3D model warped with the visual representation A 206 (e.g., in association with labels in object space of (x, y, z), etc.) to a 2D visual representation D 212 thereof (e.g., in association with labels in screen space of (x, y), etc.). Again, various computer graphic 3D rendering techniques can be applied to convert 3D models into respective 2D images using software, firmware, hardware, a combination thereof, and the like. In implementations, the conversion is performed by, for example, the 3D to 2D image converter 198 of FIG. 1.

Figure 2B:
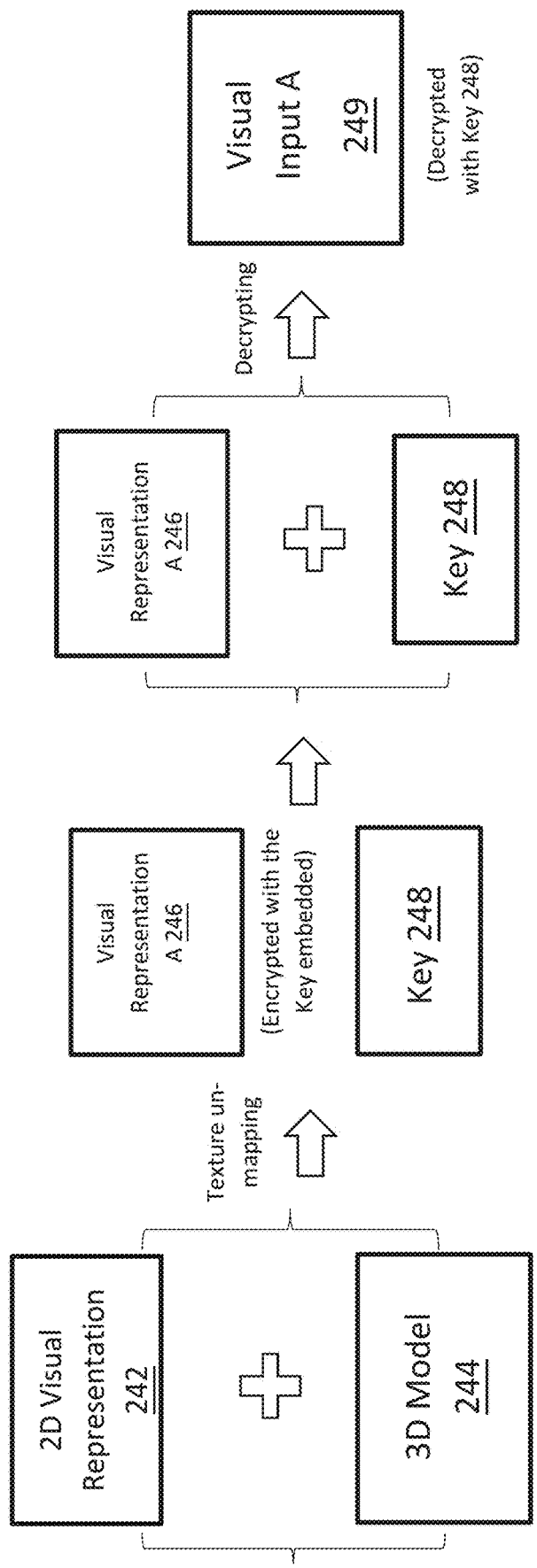
FIG. 2B is a diagram depicting exemplary texture unwarping-based decryption, in accordance with certain embodiments of the present disclosure.

FIG. 2B is a flow diagram illustrating a simplified exemplary texture unwarping-based decryption of encrypted images, consistent with exemplary aspects of at least some embodiments of the present disclosure. As In this illustrated embodiment, a 2D visual representation 242 and a 3D object model 244 may be obtained, e.g., in some embodiments, by a computing device associated with a second user. In various embodiments, the computing device of the second user receives the 2D visual representation 242 transmitted from the computing device of the first user. Here, the 2D visual representation 242 may include the 2D visual representation D 212 (of FIG. 2A), which is rendered by, for example, converting the 3D representation of the 3D model 208 warped with the visual representation A 206 into a 2D representation. In various embodiments, the 2D visual representation 242 generated at the computing device of the first user (e.g., transmitting user) may be communicated to the computing device of the second user (e.g., the receiving user) in various manners such as, via a communication network (e.g., the network 105 of FIG. 1), or a direct communication channel such as a Bluetooth or NFC connection between the computing device of the first user and the computing device of the second user. In some embodiments, the 2D visual representation 242 may also be communicated via being first transmitted to a personal transacting device (e.g., a smart transaction card) from the computing device of the first user; and then transmitted from the personal transacting device to the computing device of the second user.

In some embodiments, the 3D model 244 may be obtained by the 3D model obtaining/processing engine 154 of FIG. 1 using various techniques. For example, the 3D model obtaining/processing engine 154 may be substantially similar to the 3D model obtaining/processing engine 194 of FIG. 1 such that the 3D model 244 may be retrieved from a data storage (not shown), generated from scanning a physical 3D object (e.g., the 3D object 136, etc.) that is transferred or otherwise made available to the second user, and so on. Details similar to the aspects and functionality of the 3D model obtaining/processing engine 194 are not repeated herein.

In some embodiments, the 3D model itself, portions of the 3D model, data pertinent to where/how to retrieve the 3D model, data pertinent to how to reconstruct the 3D model may be communicated to the computing device of the second user (e.g., the receiving user) in various manners such as, via a communication network (e.g., the network 105 of FIG. 1), or a direct communication channel such as a Bluetooth or NFC connection between the computing device of the first user and the computing device of the second user. In some embodiments, such data may also be communicated via being first transmitted to a personal transacting device (e.g., a smart transaction card) from the computing device of the first user; and then transmitted from the personal transacting device to the computing device of the second user.

With access to both the 2D visual representation 242 and the 3D model 244, the computing device of the second user may unwarp the 2D visual representation 242 via the 3D model 244 to generate the encryption key 248 and the encrypted visual input A 246. Here, the encryption key may comprise the encryption key 202, which is embedded in the encrypted visual representation A 206 and warped onto the geometry of the 3D model 208. The encrypted visual input A 246 may comprise the visual input A encrypted with the key 202. In various embodiments, the texture mapping/unmapping engine 156 may be configured to perform the texture unwarping to extract the encryption key 248 and the encrypted visual input A 246 using various techniques via software, firmware, hardware, a combination thereof, and the like. Guided by the geometry of the 3D model 244, pixels rendered from 3D space can be undistorted (e.g., un-warped) to their corresponding pixels in a 2D plane. This way, the image (or portions of the image) having the key (segments of the key or keys) embedded therein may be restored from its warped state (e.g., 3D model specific protected state), from which the embedded keys (segments of the key/keys) can be extracted using various steganography techniques.

As shown in this illustrated embodiment, the extracted encrypted visual input A 246 may be in turn decrypted with the extracted key 248 to generate the visual input A 249. In some embodiment, the image/data decrypter 158 of FIG. 1 may be configured to decrypt the encrypted visual input A 246 with the key 248 using various techniques via software, firmware, hardware, a combination thereof, and the like.

Figure 3A:
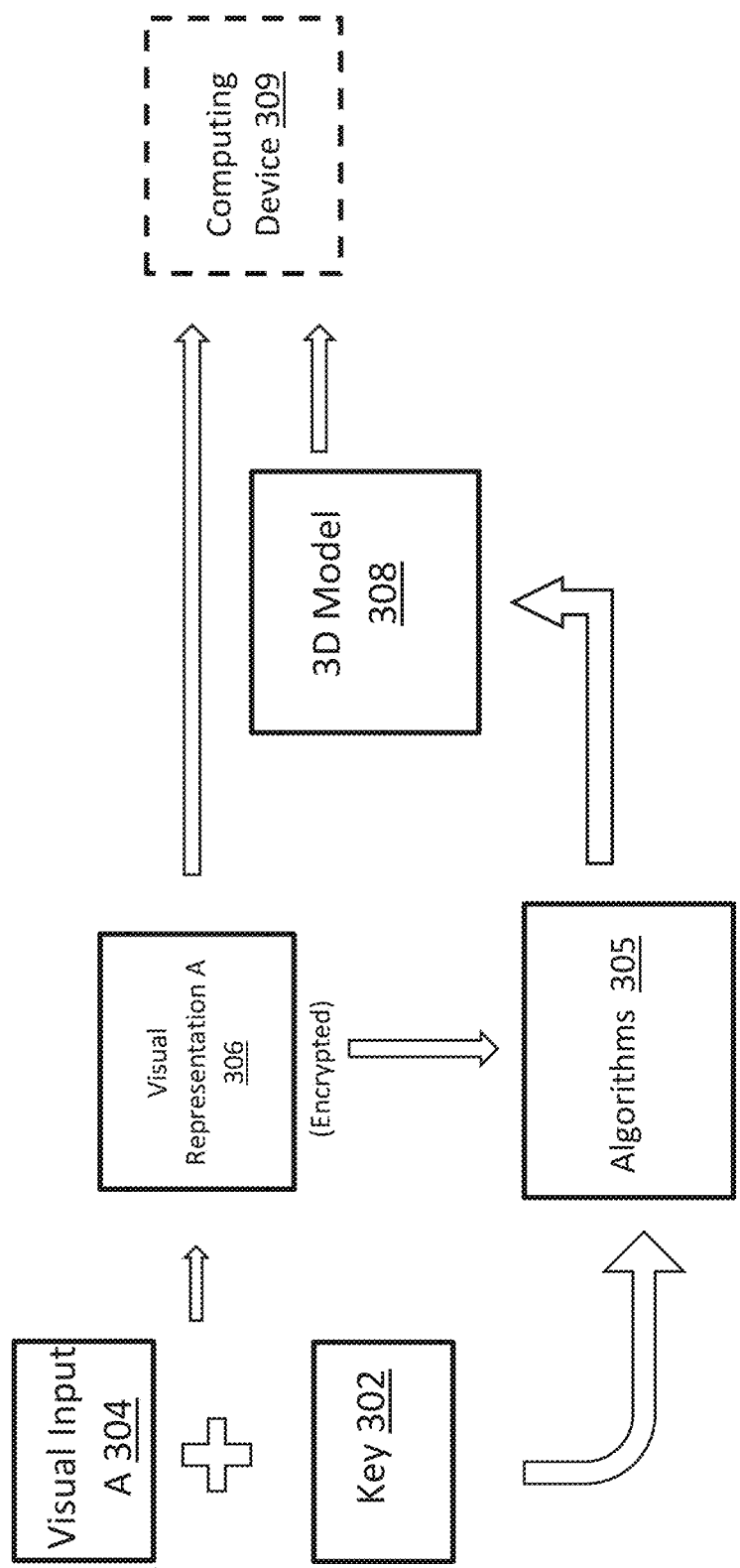
FIGS. 3A-3B are diagrams depicting exemplary data encryption and decryption involving texture warping, in accordance with certain embodiments of the present disclosure.

FIG. 3A is a diagram illustrating an exemplary simplified image encryption involving texture warping, consistent with exemplary aspects of certain embodiments of the present disclosure. In this illustrated embodiment, an encryption key 302 and a visual input A 304 may be obtained by a computing device (not shown) associated with a first user. The computing device associated with the first user may be implemented by or comprise the transmitting computing device 180 of FIG. 1, or any computing devices suitable for performing texture warping. In some examples, the visual input A 304 may be substantially similar to the visual input A 204 of the embodiment illustrated in connection with FIG. 2A; and the encryption key 302 may be substantially similar to the encryption key 202 of the embodiment illustrated in connection with FIG. 2A. In this illustrated example, the visual input A 304 may be encrypted using the encryption key 302 to generate a visual representation A 306 via various encryption techniques utilized in the embodiments illustrated with connection to FIG. 2A.

According to various embodiments, a 3D model 308 may be determined such that the encryption key 302 is derivable and/or revealed when the encrypted visual representation A 306 is mapped onto the 3D model 308. In implementations, various techniques may be utilized to identify, retrieve, generate, or otherwise obtain the 3D model 308 as an encryption key vehicle, based on the encryption key 302 and the encrypted visual representation A 306. Further, the 3D model 308 may be determined manually, using computer graphics hardware, firmware, software, or a combination thereof via various techniques as illustrated with connection to FIG. 2A. In some embodiments, the 3D model obtaining/processing engine 194 of FIG. 1 may be configured to determine the 3D model 308.

In some embodiments, the encryption key 302 may be visually revealed when the visual representation A 306 is mapped to the 3D model 308. For example, an alphanumeric strings (e.g., the encryption key 302, etc.) may be rendered into display or emerge in a 2D representation of such a warped visual representation A captured at a specific angle/direction (e.g., upside down, top down, left to right, right to left, a perspective view at an orientation configured with 3D coordinates, etc.). In some embodiments, the 3D model 308 may be constructed or retrieved as a function of an algorithm 305 that intakes the information of the key 302 and the information of the encrypted visual representation A 306. In some examples, the algorithms 305 may comprise a geometry shape descriptor that specifies one or more geometric parameters of the 3D model 308 based on the information of the key 302 and the encrypted visual representation A 306. In some examples, algorithms 305 may be configured with access to a repository (not shown) of 3D models to query the repository, with the specific geometric parameters required for the 3D model, to retrieve the qualifying 3D model. In some examples, the algorithm 305 may construct an intermediary geometric shape based on the information of the key 302 and the information of the encrypted visual representation A 306. Subsequently, the intermediary geometric shape may be utilized to either construct the 3D model, or to query the repository to retrieve the 3D model. In both cases, the intermediary geometric shape captures at least the minimum characteristics required in a 3D model in order to ensure the encryption key 302 may be derivable and/or revealed from the visual representation A 306 warped onto the 3D model 308.

In some embodiments, the encryption key 302 may be derived from the visual representation A 306 mapped to the determined 3D model 308. Various techniques for deriving or otherwise extracting information from an image may be applicable herein to derive the encryption key 302 from the warped image. In implementations, a 2D representation of the warped image may be converted into a collection of pixel values associated with, for example, their respective RBG values and/or masked/processed RBG values. Based on the collection of pixel values, the encryption key 302 may be derived using various algorithms and/or techniques. In one example, the collection of pixel values may be further converted into a collection of binary value (e.g., via a threshold) such that the collection of the pixel values renders a binary string, the entirety or portion(s) of which may be designated as the encryption key 304, or utilized to further derive the encryption key 304. In some examples, the encryption key 304 may be obtained from the visual representation A 306 warped onto the 3D model 308 in a course that combines both the visual revelation mechanisms and the derivation mechanism, in any order and/or manner suitable or otherwise configured.

In some embodiments, when the 3D model 308 is determined based on the key 302 and the visual representation A 306, parameters (not shown) pertinent to the subsequent obtaining of the key 302 may also be specified in association with the 3D model 308. For example, for the same visual representation A mapped to the same 3D model, when viewed from distinct perspectives (e.g., top down, at a side angle, etc.), different information may be rendered into display due to the geometric specifics of the 3D model (e.g., only portions of the curved surfaces of the 3D model may be visible when viewed at a certain angle, etc.). As such, in some examples, the parameters respecting the information such as how a 2D representation of the visual representation A 306 warped on the 3D model 308 is to be generated are determined as part of process of determining the 3D model 308. In some implementations, such parameters may be embedded or included as part of the information of the 3D model 308 for transmitting to a computing device 309 associated with a recipient user (e.g., a second user). In other implementations, such parameters may be transmitted to the computing device 309 of the recipient user separately from the transmitting of the information of the 3D model 308. In some embodiments, the data pertaining to the 3D model 308 and such parameters for generating a key-bearing representation of the 3D model mapped with the visual representation A may be further encrypted with the same or distinct encryption keys using the same or distinct encryption techniques. In some embodiments, the 3D model obtaining/processing engine 194 of FIG. 1 may be configured to obtain or otherwise specify the afore-described parameters associated with the 3D model 308.

In some embodiments, multiple surfaces of the determined 3D model 308 may be utilized as the basis to derive or visually reveal corresponding segments of the entire encryption key 302. Accordingly, in some embodiments, multiple 2D representations of the 3D model warped with the visual representation A 306 may be specified in order to capture the portions of the images warped by the specific surfaces. In implementations, each surfaces utilized may have a one to one, multiple to one, one to multiple, or multiple to multiple relationship with its corresponding 2D representations. Further, taking the visual revelation approach for example, only portions of the encryption key 302 may be displayed upon viewing the visual representation A 306 mapped to the 3D model 308 according to the determined parameters. As such, multiple sets of parameters regarding how a 2D representation of the visual representation A 306 warped to the 3D model 308 may be specified such that multiple 2D representations are generated to show the respective portions of the encryption key 302. In implementation, parameters may further include order information that specifies the order in which the entire encryption key 302 may be assembled with those key segments shown in their respective 2D representations.

As illustrated in this embodiment, the encrypted visual representation A 306 and the 3D model 308 are transmitted to the computing device 309 associated with the recipient user (e.g., the second user of FIG. 1, etc.). In some embodiments, the afore-described parameters for generating 2D representations may also be transmitted to the computing device 309 associated with the second user. In the scenarios where the 3D model 308 does not include the parameter information (or parameter information is not required to obtain the key 302), the encrypted visual representation A 306 and the 3D model 308 may be transmitted separately to the computing device 309 associated with the second user. In the scenarios where the parameters are required to obtain the key 302, each of the encrypted visual representation A 306, 3D model 308, and/or the parameters (not shown) may be transmitted separately to the computing device 309 associated with the second user; or at most two of the encrypted visual representation A 306, 3D model 308, and/or the parameters (not shown) may be transmitted separately to the computing device 309 associated with the second user. In implementations, the transmission of data between the computing device 309 associated with the sending user and the computing device associated with the recipient user may entail the transmitting of the information that can be utilized to access or otherwise obtain one or more of the of the encrypted visual representation A 306, 3D model 308, and/or the parameters.

Figure 3B:
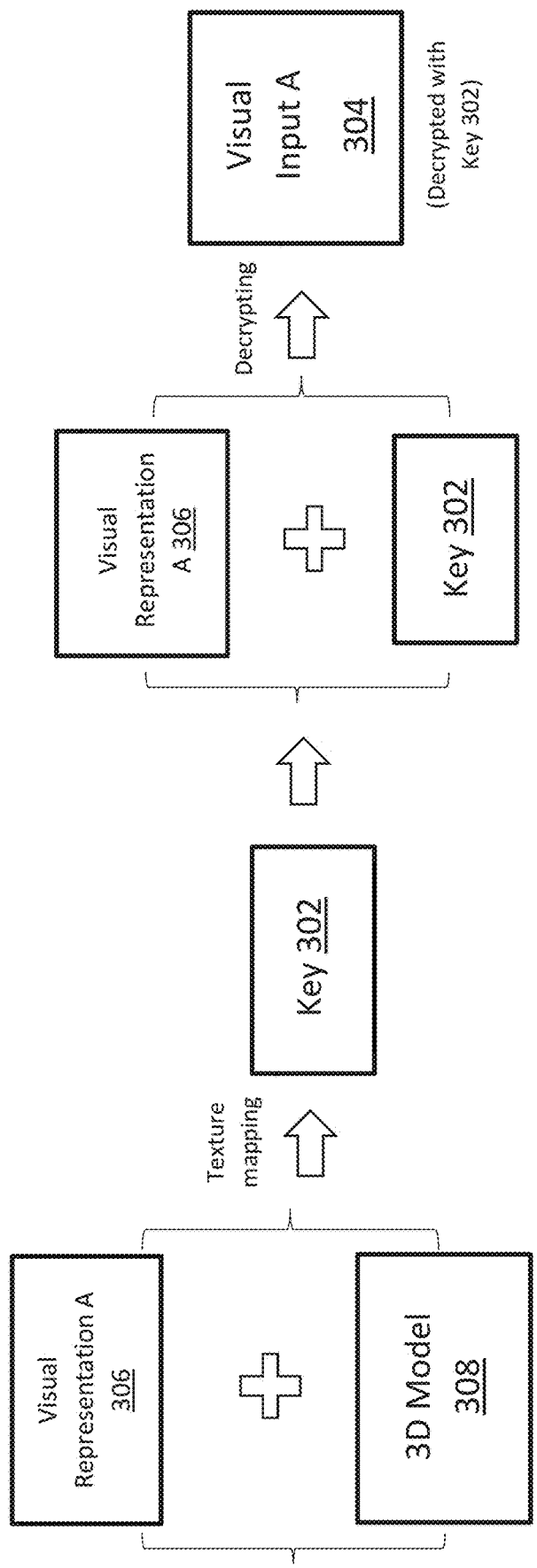

FIG. 3B is a flow diagram illustrating a simplified exemplary texture warping-based decryption of encrypted images, consistent with exemplary aspects of at least some embodiments of the present disclosure. In this illustrated embodiment, the encrypted visual representation A 306 and the 3D object model 308 may be obtained, e.g., in some embodiments, by a computing device associated with a second user (e.g., computing device 309 of FIG. 3A). In turn, the visual representation A 306 may be mapped to the 3D model 308 to warp the visual representation A 306 for the purpose of obtaining the encryption key 302. Any suitable techniques may be utilized to perform the texture mapping to generate one or more visual representations of the 3D model 308 texture-mapped with the visual representation A 306, the details of which that are substantially similar to those illustrated in connection with FIG. 2A are not repeated herein. As described with connection to FIG. 3A, the texture mapping operation may be configured such that the encryption key 302 may be visually revealed and/or derived based on the mapped 3D model 308.

In some embodiments (not shown), parameters with regard to how to process the visual representation A 306 warped onto the 3D model 308 to obtain the key 302 may be also obtained e.g., by the computing device associated with the second user. In this scenario, the 3D model 308 texture-mapped with the visual representation A 306 may be further processed to generate visual representations based on the parameters, the results of which serve as the basis to display and/or derive the entire or portions of the encryption key 302. Details that are substantially similar to those illustrated with connection to FIG. 3A are not repeated herein.

Once the encryption key 302 is revealed and/or derived based on the result of texture mapping the visual representation A 306 to the 3D model 308, the visual representation A 306 may be subsequently decrypted using the encryption key 302 to obtain the visual input A 304. Any suitable techniques may be applied to decrypt the visual representation A 306 with the encryption key 302, the details of which that are substantially similar to those illustrated in connection with FIGS. 2A-2B are not repeated herein.

Figure 3C:
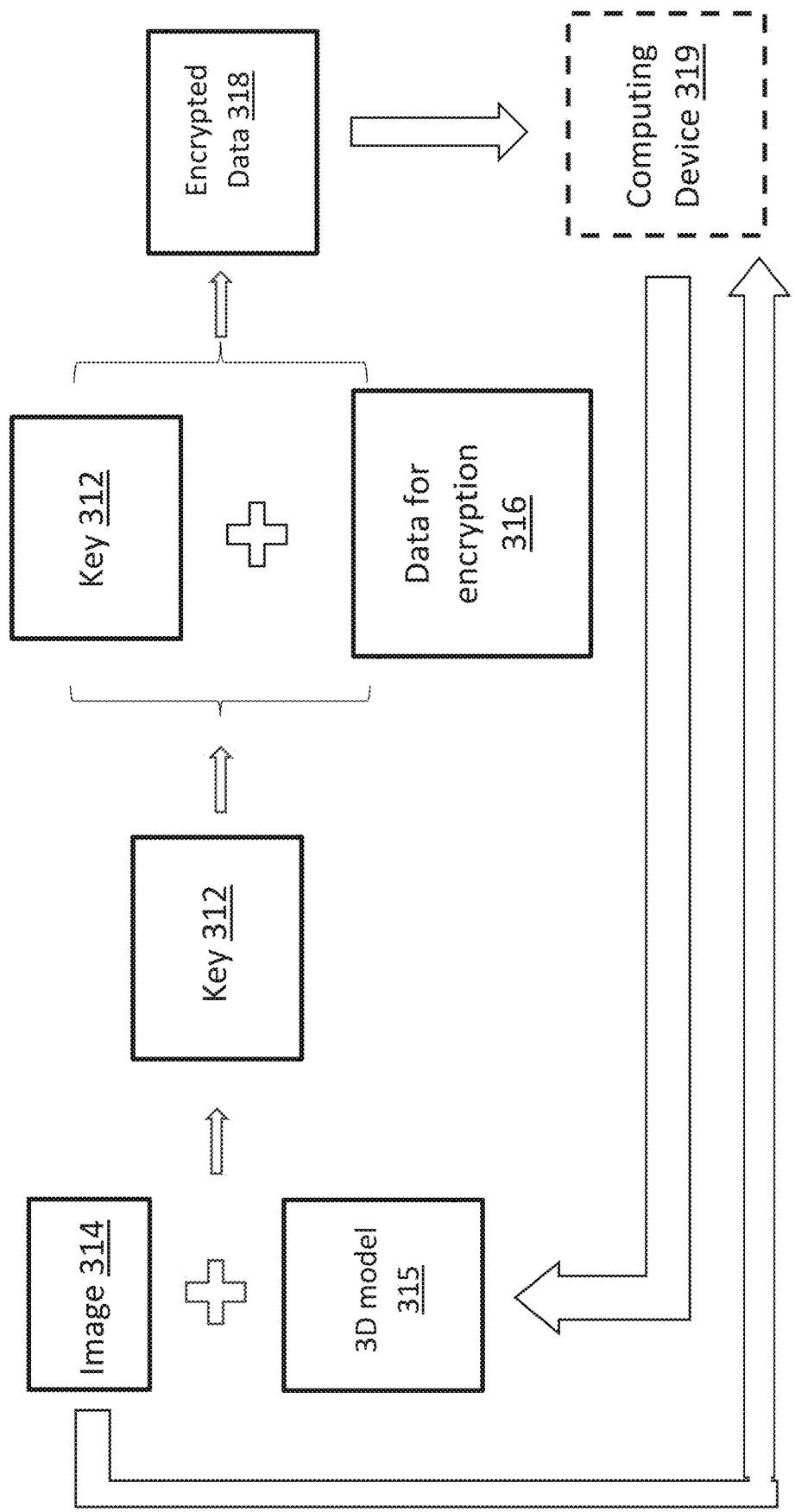
FIG. 3C is a diagram depicting exemplary data encryption involving texture warping, in accordance with certain embodiments of the present disclosure.

FIG. 3C is a diagram illustrating another exemplary simplified texture warping-based encryption of data, consistent with exemplary aspects of certain embodiments of the present disclosure. In this illustrated embodiment, a 3D model 315 may be uploaded by a computing device 319 associated with a user to a server (not shown). The computing device 319 associated with the user may be implemented by or comprise the transmitting computing device 180 of FIG. 1, the receiving computing device 150 of FIG. 1, or any computing devices suitable for performing texture warping. The server may be implemented by, e.g., the server 101 of FIG. 1, or any computing devices suitable for performing texture warping. In some embodiments, information that can be used to obtain or generate the 3D model 315 may be uploaded to the server instead. The 3D model 315 may be retrieved, constructed or otherwise obtained by the computing device 319 associated with the user via various suitable techniques such as those described in the embodiments illustrated with connection to FIGS. 2A-2B, the details of which are not repeated herein.

In some embodiments, the computing device 319 associated with the user may upload/transmit the 3D model 315 to a computing device associated with another user in ways substantially similar to how the transmitting computing device associated with the first user transmits the 3D model to the receiving computing device associated with the second user in the embodiments as above-illustrated in connection to FIG. 1. In this scenario, the computing device 319, instead of the server, may be configured to generate the encryption key 312 utilizing the image 314 and the 3D model 315, as well as encrypting the data 316 with the encryption key 312 to generate the encrypted data 318. Similarly, an image 314 and the encrypted data 318 may be transmitted to the computing device associated with another user. For the purpose of simplicity, the following illustrates the exemplary texture warping based key generation with the example of the server as the key generating and encryption party and the computing device 319 as the decrypting party.

In the embodiment illustrated herein, the image 314 may be obtained by the server. According to various aspects of the invention, the image 314 may be any image available, generated by, or otherwise accessible to the server. In some embodiments, the image 314 may also be uploaded by the computing device associated with the first user. In some embodiments, the image 314 may be a random image retrieved, generated, modified, or otherwise obtained by the server.

In this exemplary embodiment, the server may be configured to texture map the image 314 to the 3D model 315 to generate the encryption key 312. With regard to the various operations to derive/display the encryption key 312 via texture mapping, the details are substantially similar to the embodiments illustrated with connection to FIG. 3A and are not repeated herein. Also similar to the embodiments illustrated in FIG. 3A, the encryption key 312 may comprise a plurality of key segments, which may be generated via processing the 3D model mapped with the image 314 with parameters configured to generate respective 2D representations.

After obtaining the encryption key 312, the server may encrypt any type of data 316 with the encryption key 312 to generate encrypted data 318. Such data may include, for example, imagery data, textual data, video data, audio data, hologram data, and the like. Various encryption techniques may be applied to encrypt the data 316 with the key 312 to generate the encrypted data 318. Once the encrypted data 318 is generated, the server may transmit the encrypted data 318 and the image 314 to the computing device 319. In some embodiments, the encrypted data 318 and the image 314 may be transmitted to the computing device 319 together. In some embodiments, the encrypted data 318 and the image 314 may be transmitted separately to the computing device 319.

In the embodiments illustrated herein, the computing device 319 is the device that uploads the 3D model 315 to the server in the first place. Therefore, the computing device 319 is already in possession or otherwise can obtain/access the 3D model 315 utilized to generate the key 312 at the server. Once the computing device 319 receives the image 314 from the server, the computing device 319 may texture map the image 314 to the 3D model to obtain the key 312 (e.g., derive and/or reveal, etc.), the details of which are substantially similar to those embodiments illustrated with connection to FIGS. 3A-3B and not repeated herein. With the encryption key 312, the computing device 319 may decrypt the received encrypted data 318 with the encryption key 312 to extract the data 316.

Figure 4A:
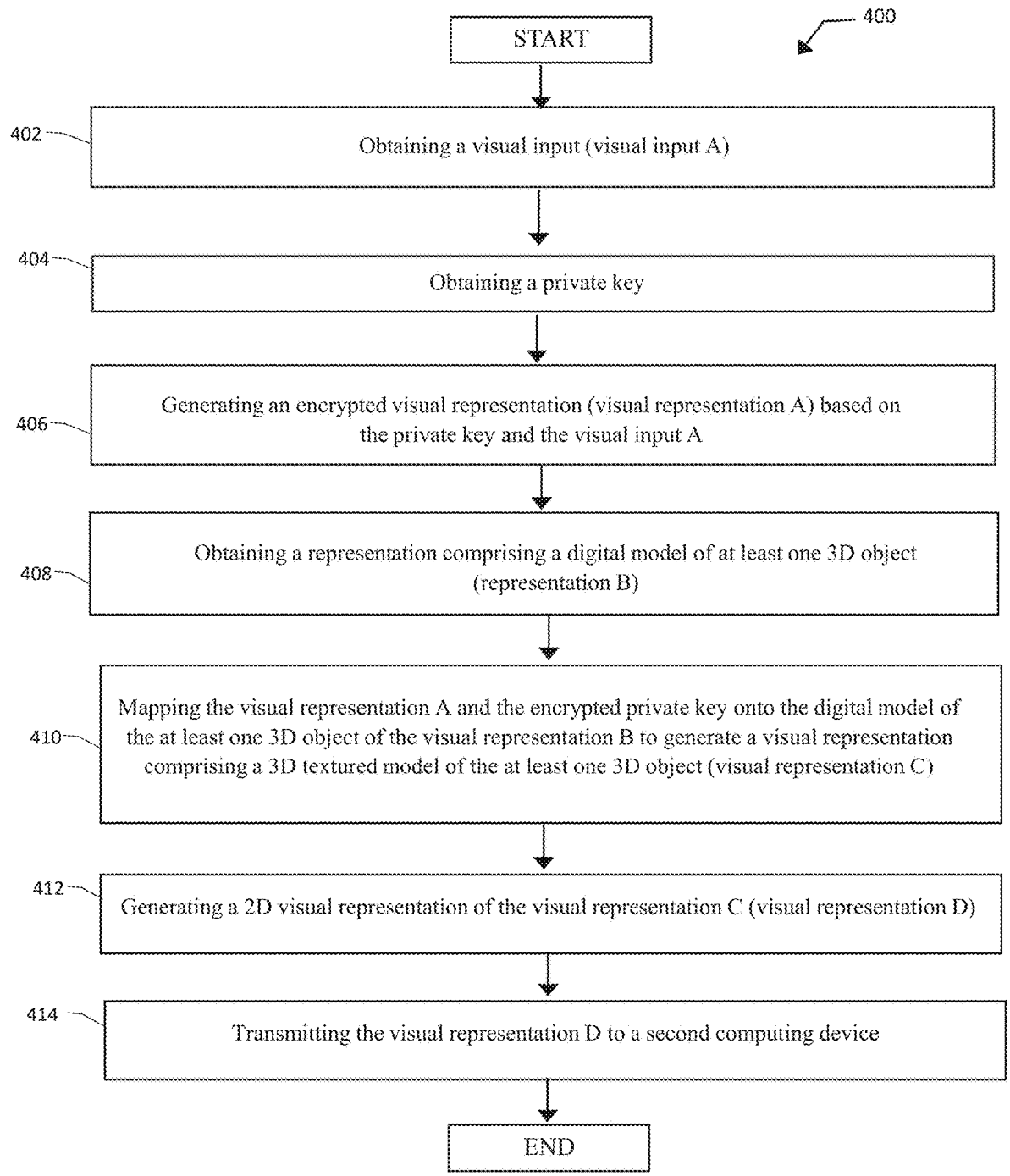
FIGS. 4A-4C are flowcharts illustrating exemplary processes related to data encryption and decryption involving texture warping and/or un-warping, consistent with exemplary aspects of certain embodiments of the present disclosure.

FIG. 4A is a flow diagram illustrating an exemplary process 400 related to texture warping-based encryption and decryption, consistent with exemplary aspects of at least some embodiments of the present disclosure. Referring to FIG. 4A, the illustrative texture warping-based encryption and decryption process 400 may comprise: obtaining a visual input (e.g., visual input A, etc.), at 402; obtaining, a private key, at 404; generating an encrypted visual representation (e.g., visual representation A, etc.) based on the private key and the visual input A, at 406; accessing a representation comprising a digital model of at least one 3D object (e.g., visual representation B, etc.), at 408; mapping the visual representation A and the encrypted private key onto the digital model of the at least one 3D object of the visual representation B to generate a visual representation comprising a 3D textured model of the at least one 3D object (e.g., visual representation C, etc.), at 410; and generating a 2D visual representation of the visual representation C (e.g., visual representation D, etc.), at 412. In other embodiments, the illustrative texture warping-based encryption and decryption process 400 may be carried out, in whole or in part, in conjunction with a server, a personal transacting device, and/or a mobile device that is connected via one or more networks to the server, which is executing instructions performing one or more steps or aspects of various embodiments described herein.

In some embodiments, texture warping-based encryption and decryption process 400 may include, at 402, a step of obtaining a visual input (e.g., visual input A, etc.). With regard to the disclosed innovation, the visual input A may be obtained by a first computing device associated with a first user, which encrypts the visual input A and transmits the encrypted visual input A to a second computing device associated with a second user. In some embodiments, the first user may be an institute such as an entity that provides services (e.g., issues a smart transaction card) to the second user. Here, for example, the first computing device may comprise a financial service provider (FSP) system. This FSP system may comprise one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers. In some embodiments, the second user may be the entity that provides services (e.g., issues a smart transaction card) to the second user. In this example, the second computing device may comprise the above-described FSP system.

In some embodiments, the visual input may comprise one or more of: an image, a QR code (a two-dimensional version of the barcode, typically made up of black and white pixel patterns), a plurality of images, a plurality of QR codes, at least one frame of a video, at least a portion of one frame of a video, at least a portion of an image, at least a first portion of a first frame and a second portion of a second frame of a video.

The texture warping-based encryption and decryption process 400 may include, at 404, a step of obtaining a private key; and at 406, a step of generating an encrypted visual representation (visual representation A) based on the private key and the visual input A. According to some embodiments, the visual representation A may comprise the private key and an encrypted visual input A of the visual input A.

The texture warping-based encryption and decryption process 400 may include, at 408, a step of accessing a representation comprising a digital model of at least one 3D object (e.g., visual representation B, etc.). Embodiments herein may be configured to obtain a visual representation comprising a digital model of at least one 3D object. In implementations, the 3D object may comprise at least one of: a physical object, and a visual representation of 3D printed object. In some embodiments, the 3D object may comprise a 3D model of a user's face. For example, the 3D object may comprise a 3D model of either the first user's face or the second user's face. In some embodiments, the 3D object may comprise a 3D model of a personal object of the first user, and the second user has an identical personal object or access (e.g., photos, videos, etc.) to the personal object of the first user.

According to certain embodiments, the texture warping-based encryption and decryption process 400 may include, at 410 a step of mapping, by the first computing device, the visual representation A and the encrypted private key onto the digital model of the at least one 3D object of the visual representation B to generate a visual representation comprising a 3D textured model of the at least one 3D object (e.g., visual representation C, etc.).

In some embodiments, the texture warping-based encryption and decryption process 400 may include, at 412 a step of generating a 2D visual representation of the visual representation C (e.g., visual representation D, etc.). In some embodiment, the texture warping-based encryption and decryption process 400 may further include at 414 a step of transmitting the visual representation D to a second computing device associated with a second user. In various embodiments, the second computing device may be configured to: receive the visual representation D; obtain the visual representation B; map the visual representation D to the visual representation B to extract the visual representation A and the private key; and decode, based on the private key, the visual representation A to obtain the visual input A.

Figure 4B:
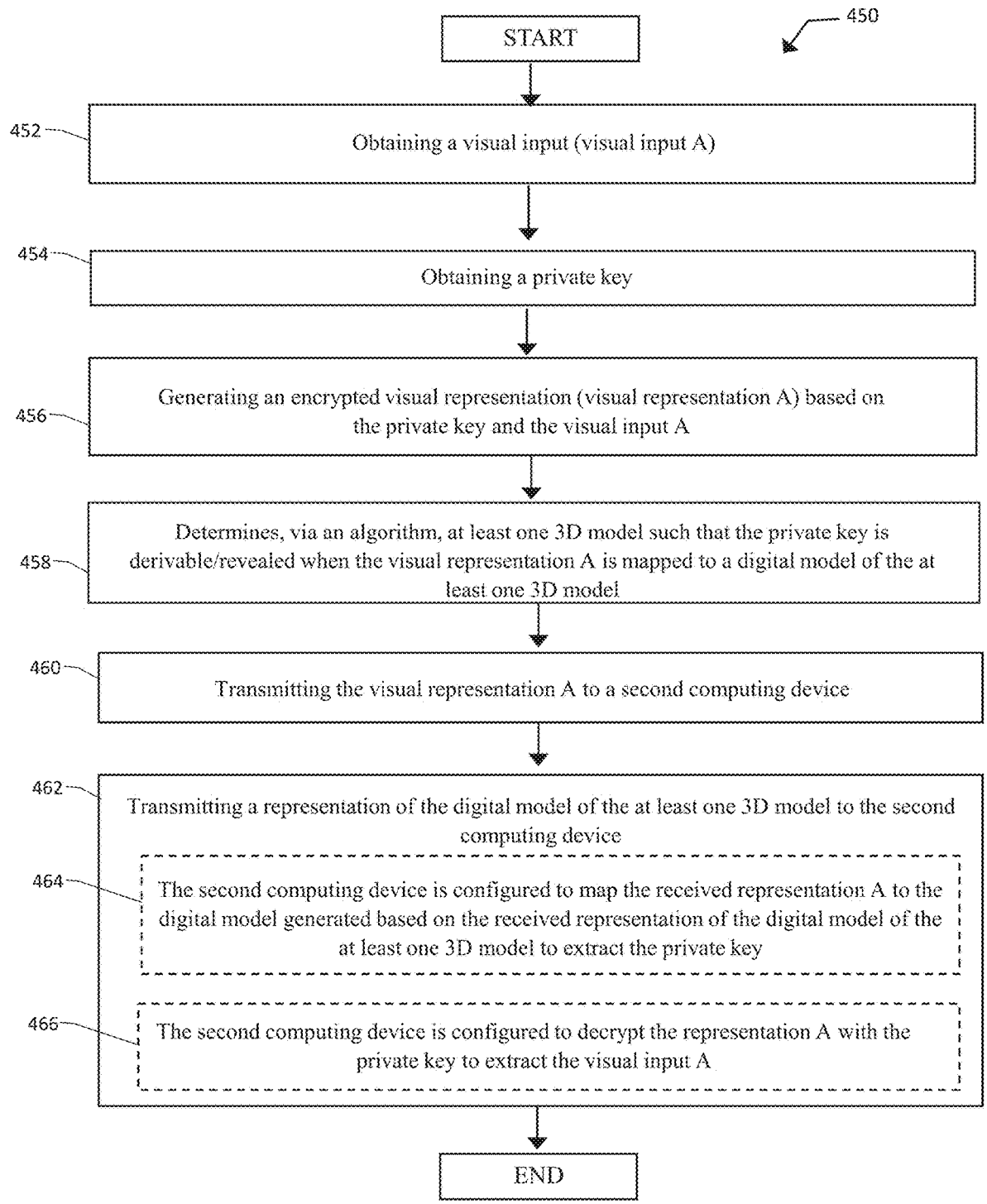

FIG. 4B is a flow diagram illustrating another exemplary image encryption and decryption process 450 involving texture warping, consistent with exemplary aspects of at least some embodiments of the present disclosure. In FIG. 4B, the illustrative image encryption and decryption process 450 may comprise: obtaining a visual input (e.g., visual input A, etc.), at 452; obtaining a private key, at 454; generating an encrypted visual representation (e.g., visual representation A, etc.) based on the private key and the visual input A, at 456; determining at least one 3D object such that the private key is derivable/revealed when the visual representation A is mapped to a digital model of the at least one 3D object, at 458; transmitting the visual representation A to a second computing device, at 460, and transmitting a representation of the digital model of the at least one 3D model to the second computing device, at 462. In some embodiments, the second computing device may be configured to map the received representation A to the digital model generated based on the received representation of the digital model of the at least one 3D model to extract the private key, at 464; and/or decrypt the received representation A with the private key to extract the visual input A, at 466. In various embodiments, illustrative image encryption and decryption process 450 may be carried out, in whole or in part, in conjunction with a server, a personal transacting device, and/or a mobile device that is connected via one or more networks to the server, which is executing instructions performing one or more steps or aspects of various embodiments described herein.

Figure 4C:
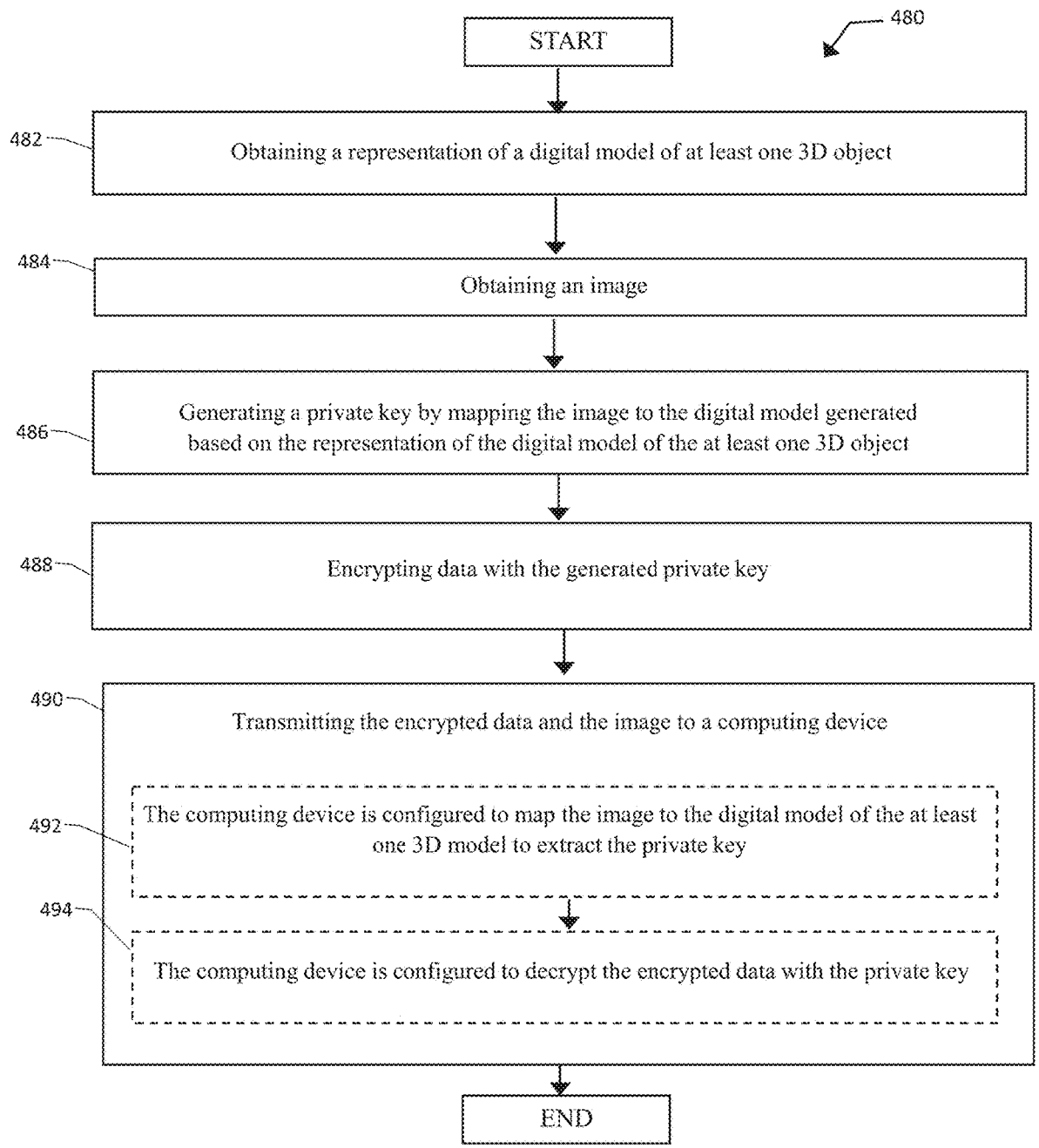

FIG. 4C is a flow diagram illustrating yet another exemplary image encryption and decryption process 480 involving texture warping, consistent with exemplary aspects of at least some embodiments of the present disclosure. In FIG. 4C, the illustrative image encryption and decryption process 480 may comprise: obtaining a representation of a digital model of at least one 3D object, at 482; obtaining an image, at 484; generating a private key by mapping the image to the digital model generated based on the representation of the digital model of the at least one 3D object, at 486; encrypting data with the generated private key, at 488; and transmitting the encrypted data and the image to a computing device, at 490. In some embodiments, the representation of a digital model of at least one 3D object may be uploaded by the computing device. In some embodiments, the computing device may be configured to map the received image to the digital model of the at least one 3D model to extract the private key, at 492; and/or decrypt the received encrypted data with the private key, at 494. In various embodiments, illustrative image encryption and decryption process 480 may be carried out, in whole or in part, in conjunction with a server, a personal transacting device, and/or a mobile device that is connected via one or more networks to the server, which is executing instructions performing one or more steps or aspects of various embodiments described herein.

Figure 5:
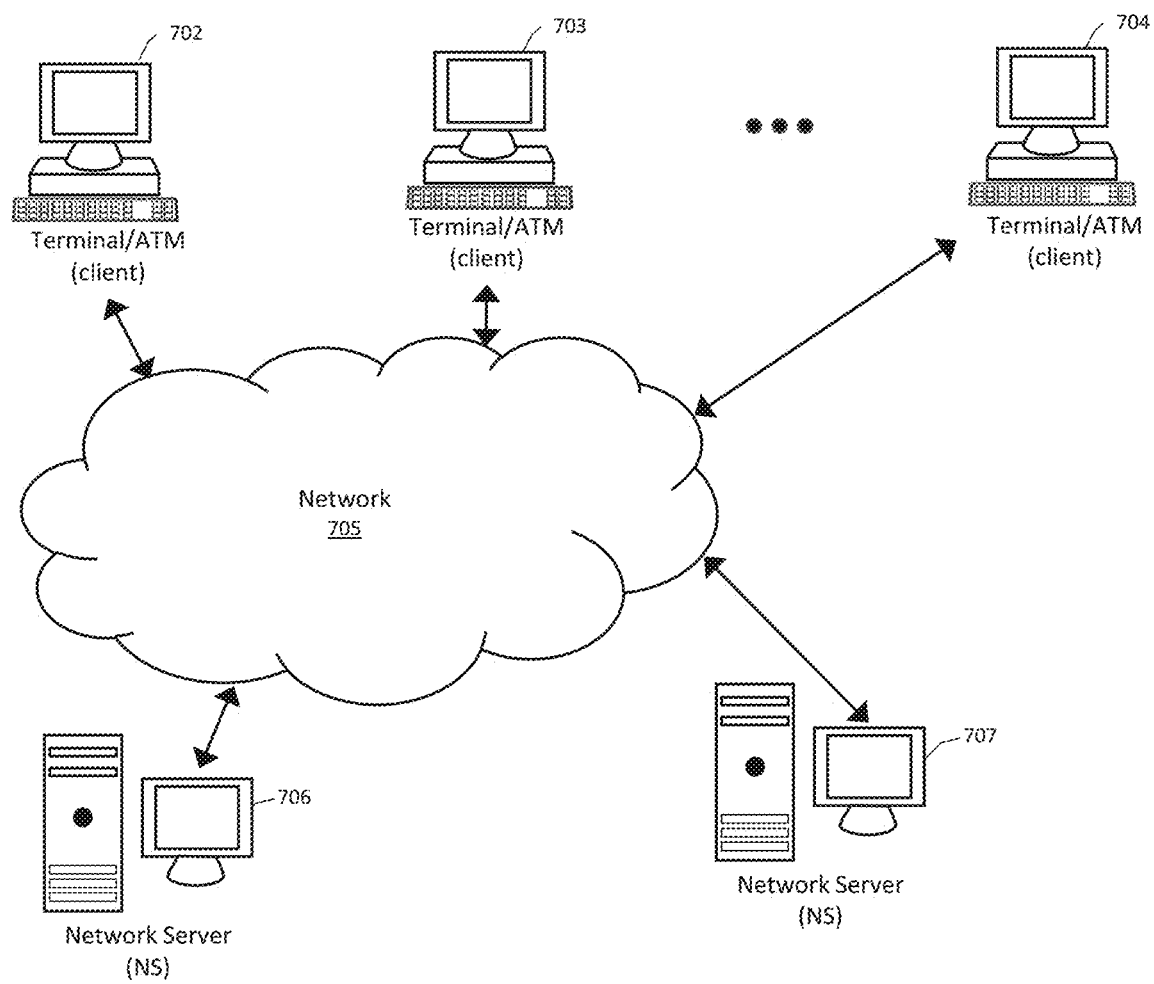
FIG. 5 is a block diagram depicting an exemplary computer-based system and/or platform, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 702-704 (e.g., POS devices or clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
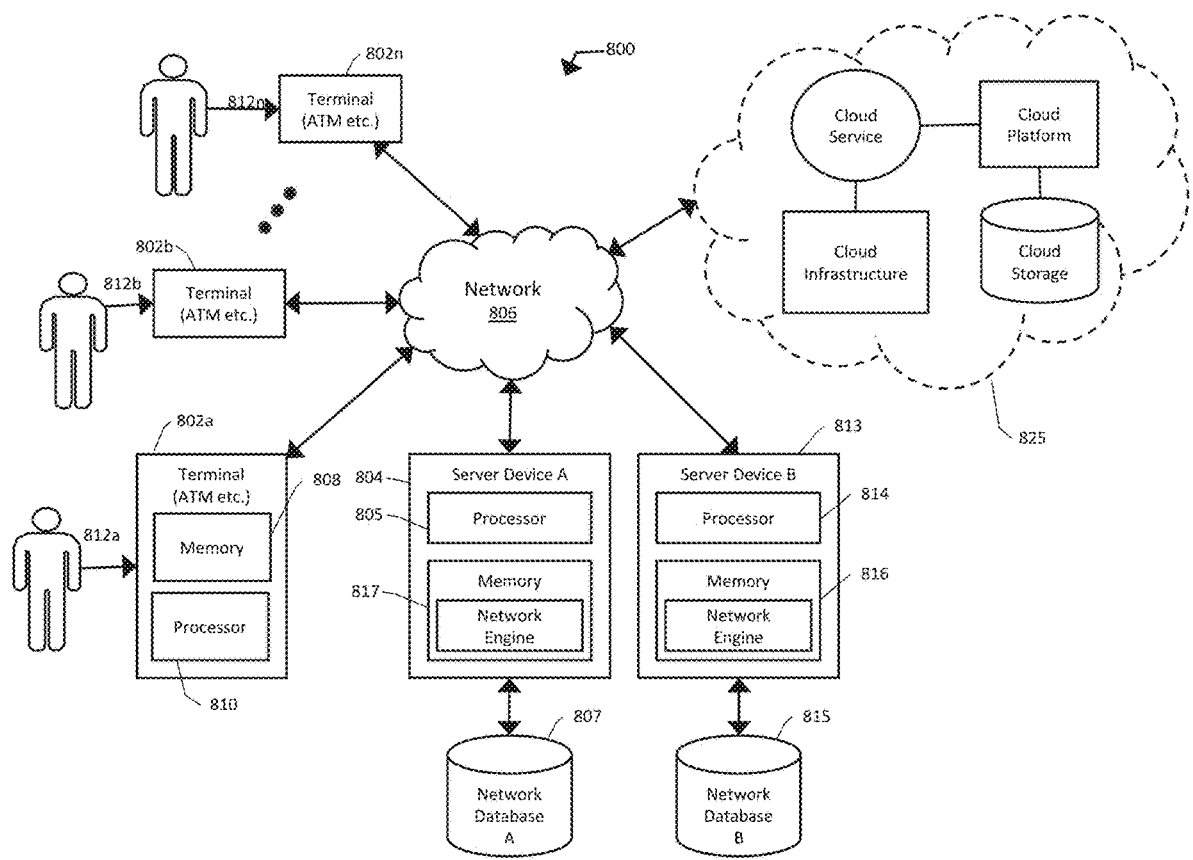
FIG. 6 is a block diagram depicting another exemplary computer-based system and/or platform, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., POS devices) 802a, 802b through 802n shown each at least includes computer-readable media, such as a random-access memory (RAM) 808 coupled to a processor 810 and/or memory 808. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806.

As shown in FIG. 6, exemplary server devices 804 and 813 may be also coupled to the network 806. In some embodiments, one or more member computing devices 802a through 802n may be mobile clients. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
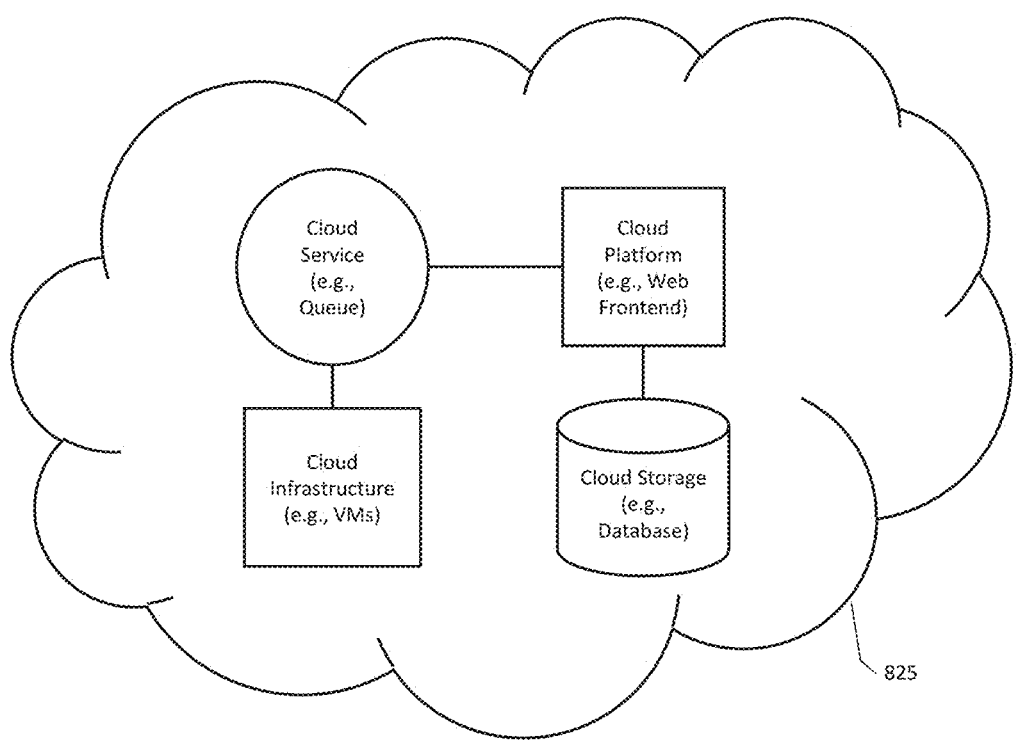
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
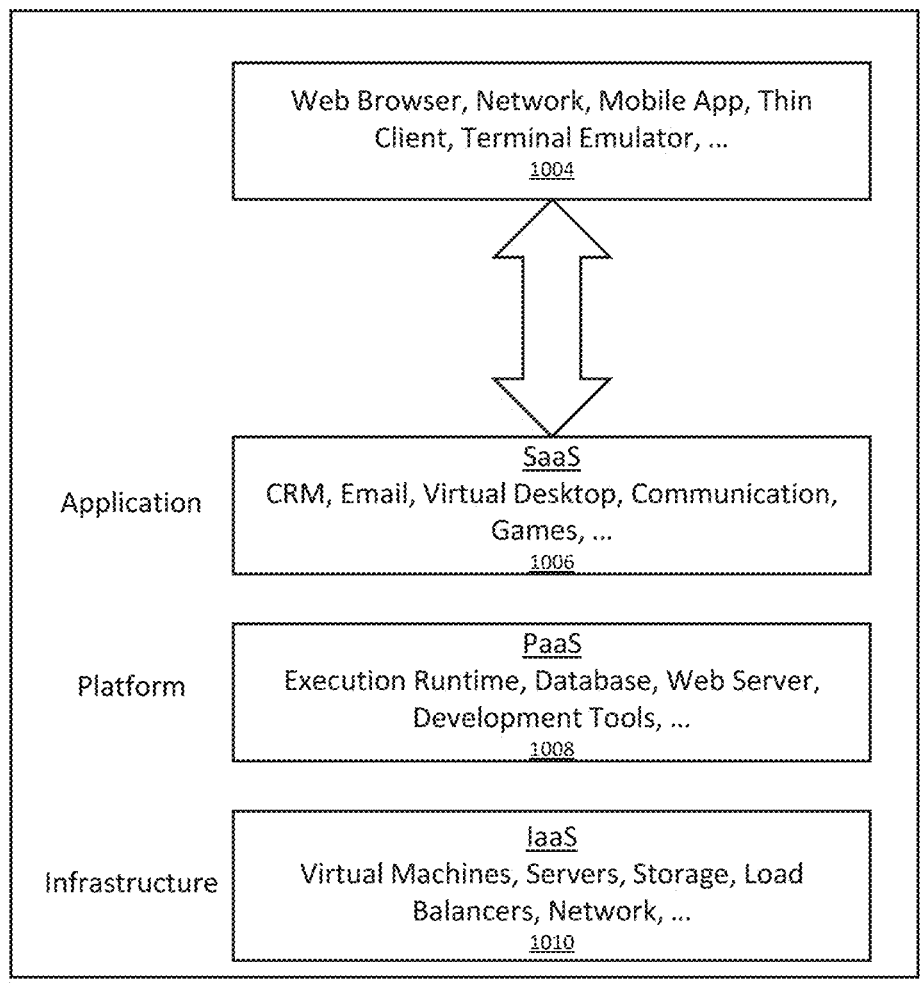

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method comprising:
  obtaining, by a first computing device associated with a first user, a visual input (visual input A);
  obtaining, by the first computing device, a private key;
  generating, by the first computing device, an encrypted visual representation (visual representation A) based on the private key and the visual input A, wherein the visual representation A comprises the private key and an encrypted visual input A of the visual input A;
  accessing, by the first computing device, a representation comprising a digital model of at least one 3D object (visual representation B);
  mapping, by the first computing device, the visual representation A and the encrypted private key onto the digital model of the at least one 3D object of the visual representation B to generate a visual representation comprising a 3D textured model of the at least one 3D object (visual representation C);
  generating, by the first computing device, a 2D visual representation of the visual representation C (visual representation D);
  transmitting, by the first computing device, the visual representation D to a second computing device associated with a second user; wherein the second computing device is configured to:
    receive the visual representation D;
    obtain the visual representation B;
    map the visual representation D to the visual representation B to extract the visual representation A and the private key; and
    decode, based on the private key, the visual representation A to obtain the visual input A.

Clause 2. The method of clause 1 or of any clause herein, wherein the visual input is an image.

Clause 3. The method of clause 1 or any clause herein, wherein the visual input comprises a QR code.

Clause 4. The method of clause 3 or any clause herein, wherein the 3D object is a 3D model of a user's face.

Clause 5. The method of clause 1 or any clause herein, wherein the visual input comprises a plurality of images.

Clause 6. The method of clause 1 or any clause herein, wherein the 3D object comprises a plurality of 3D objects.

Clause 7. The method of clause 1 or any clause herein, wherein the visual input is at least one frame of a video.

Clause 8. The method of clause 1 or any clause herein, wherein the 3D object is at least one of: a physical object, and a visual representation of 3D printed object.

Clause 9. The method of clause 1 or any clause herein, wherein the visual input comprise at least a portion of one frame of a video.

Clause 10. The method of clause 1 or any clause herein, wherein the visual input comprise at least a first portion of a first frame and a second portion of a second frame of a video.

Clause 11. A system comprising:
  one or more processors; and
  a memory in communication with the one or more processors and storing instructions that,
    when executed by the one or more processors, cause the one or more processors to:

obtain a visual input (visual input A);
obtaining a private key;
generate an encrypted visual representation (visual representation A) based on the private key and the visual input A, wherein the visual representation A comprises the private key and an encrypted visual input A of the visual input A;
accessing a representation comprising a digital model of at least one 3D object (visual representation B);
map the visual representation A and the encrypted private key onto the digital model of the at least one 3D object of the visual representation B to generate a visual representation comprising a 3D textured model of the at least one 3D object (visual representation C);
generate a 2D visual representation of the visual representation C (visual representation D);
transmit the visual representation D to a second computing device associated with a second user; wherein the second computing device is configured to:
receive the visual representation D;
obtain the visual representation B;
map the visual representation D to the visual representation B to extract the visual representation A and the private key; and
decode, based on the private key, the visual representation A to obtain the visual input A.

Clause 12. The system of clause 11 or of any clause herein, wherein the visual input is an image.

Clause 13. The system of clause 11 or of any clause herein, wherein the visual input comprises a QR code.

Clause 14. The system of clause 11 or of any clause herein, wherein the 3D object is at least one of: a physical object, and a visual representation of 3D printed object.

Clause 15. The system of clause 11 or of any clause herein, wherein the 3D object is a 3D model of a user's face.

Clause 16. The system of clause 11 or of any clause herein, wherein the visual input comprises a plurality of images.

Clause 17. The system of clause 11 or of any clause herein, wherein the 3D object comprises a plurality of 3D objects.

Clause 18. The system of clause 11 or of any clause herein, wherein the visual input is at least one frame of a video.

Clause 19. The system of clause 11 or of any clause herein, wherein the visual input comprise at least a portion of one frame of a video.

Clause 20. A non-transitory computer readable storage medium for tangibly storing computer program instructions capable of being executed by a computer processor, the computer program instructions defining the steps of:
obtaining, by a first computing device associated with a first user, a visual input (visual input A);
obtaining, by the first computing device, a private key;
generating, by the first computing device, an encrypted visual representation (visual representation A) based on the private key and the visual input A, wherein the visual representation A comprises the private key and an encrypted visual input A of the visual input A;
accessing, by the first computing device, a representation comprising a digital model of at least one 3D object (visual representation B);
mapping, by the first computing device, the visual representation A and the encrypted private key onto the digital model of the at least one 3D object of the visual representation B to generate a visual representation comprising a 3D textured model of the at least one 3D object (visual representation C);
generating, by the first computing device, a 2D visual representation of the visual representation C (visual representation D);
transmitting, by the first computing device, the visual representation D to a second computing device associated with a second user; wherein the second computing device is configured to:
receive the visual representation D;
obtain the visual representation B;
map the visual representation D to the visual representation B to extract the visual representation A and the private key; and
decode, based on the private key, the visual representation A to obtain the visual input A.

Clause 21. A method comprising:
obtaining, by a first computing device associated with a first user, a visual input (visual input A);
obtaining, by the first computing device, a private key;
generating, by the first computing device, an encrypted visual representation (visual representation A) based on the private key and the visual input A;
determining, by the first computing device, based at least in part on the private key, at least one 3D object configured so that the private key is derivable when the visual representation A is mapped to a digital model of the at least one 3D object;
transmitting, by the first computing device, the visual representation A to a second computing device associated with a second user;
transmitting, by the first computing device, a representation of the digital model of the at least one 3D model to the second computing device; and
instructing, by the first computing device, the second computing device so that the second computing device is configured to:
receive the visual representation A;
obtain the representation of the digital model of the at least one 3D model;
map the visual representation A to the digital model generated based on the representation of the digital model of the at least one 3D model to extract the private key; and
decode, based on the private key, the visual representation A to obtain the visual input A.

Clause 22. The method of clause 21 or of any clause herein, wherein the visual input is an image.

Clause 23. The method of clause 21 or of any clause herein, wherein the visual input comprises a QR code.

Clause 24. The method of clause 21 or of any clause herein, wherein the 3D object is at least one of: a physical object, and a visual representation of 3D printed object.

Clause 25. The method of clause 21 or of any clause herein, wherein the 3D object is a 3D model of a user's face.

Clause 26. The method of clause 21 or of any clause herein, wherein the visual input comprises a plurality of images.

Clause 27. The method of clause 21 or of any clause herein, wherein the 3D object comprises a plurality of 3D objects.

Clause 28. The method of clause 21 or of any clause herein, wherein the visual input is at least one frame of a video.

Clause 29. The method of clause 21 or of any clause herein, wherein the visual input comprise at least a portion of one frame of a video.

Clause 30. The method of clause 21 or of any clause herein, wherein the visual input comprise at least a first portion of a first frame and a second portion of a second frame of a video.

Clause 31. The method of clause 21 or of any clause herein, wherein the determining at least one 3D object comprises applying the private key and the visual representation A to an algorithm.

Clause 32. A method comprising:
obtaining, by a first computing device, a representation of a digital model of at least one 3D object, the representation of a digital model of at least one 3D object uploaded by a second computing device;
obtaining, by the first computing device, a visual input;
generating, by the first computing device, a private key by mapping the visual input to the digital model generated based on the representation of the digital model of the at least one 3D object;
encrypting, by the first computing device, data with the generated private key;
transmitting, by the first computing device, the visual input and the encrypted data to the second computing device, wherein the second computing device is configured to:
map the received visual input to the digital model of the at least one 3D model to extract the private key; and
decode, based on the private key, the encrypted data.

Clause 33. The method of clause 32 or of any clause herein, wherein the visual input is an image.

Clause 34. The method of clause 32 or of any clause herein, wherein the visual input comprises a QR code.

Clause 35. The method of clause 32 or of any clause herein, wherein the 3D object is at least one of: a physical object, and a visual representation of 3D printed object.

Clause 36. The method of clause 32 or of any clause herein, wherein the 3D object is a 3D model of a user's face.

Clause 37. The method of clause 32 or of any clause herein, wherein the visual input comprises a random visual input.

Clause 38. The method of clause 32 or of any clause herein, wherein the visual input is at least one frame of a video.

Clause 39. The method of clause 32 or of any clause herein, wherein the visual input comprises at least a portion of one frame of a video.

Clause 40. A system comprising:
one or more processors; and
a memory in communication with the one or more processors and storing instructions that, when executed by the one or more processors, cause the one or more processors to:
obtaining a visual input (visual input A);
obtaining a private key;
generating an encrypted visual representation (visual representation A) based on the private key and the visual input A;
determining at least one 3D object such that the private key is derivable/revealed when the visual representation A is mapped to a digital model of the at least one 3D object;
transmitting the visual representation A to a second computing device associated with a second user; and
transmitting a representation of the digital model of the at least one 3D model to the second computing device, wherein the second computing device is configured to:
receive the visual representation A;
obtain the representation of the digital model of the at least one 3D model;
map the visual representation A to the digital model generated based on the representation of the digital model of the at least one 3D model to extract the private key; and
decode, based on the private key, the visual representation A to obtain the visual input A.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
obtaining, by a first computing device associated with a first user, a visual input;
obtaining, by the first computing device, a private key;
generating, by the first computing device, an encrypted visual representation based on the private key and the visual input, wherein the encrypted visual representation is generated by embedding the private key into the visual input;
generating, by the first computing device, a three-dimensional (3D) visual representation by texture mapping the encrypted visual representation onto a digital model of at least one 3D object, wherein the digital model of the at least one 3D object comprises a collection of points in three-dimensional space;
converting, by the first computing device, the 3D visual representation to a two-dimensional (2D) visual representation;
transmitting, by the first computing device, the 2D visual representation to a second computing device associated with a second user;
transmitting, by the first computing device, a representation of the digital model of the at least one 3D object to the second computing device; and
wherein the second computing device is configured to:
receive the 2D visual representation;
obtain the representation of the digital model of the at least one 3D object;
un-warp the 2D visual representation using the digital model of the 3D object to generate the encrypted visual representation;
extract, based on the un-warping of the 2D visual representation using the digital model of the 3D object, the private key; and
decode, based on the private key, the encrypted visual representation to obtain the visual input.

2. The method of claim 1, wherein the visual input is an image.

3. The method of claim 1, wherein the visual input comprises a QR code.

4. The method of claim 1, wherein the 3D object is at least one of: a physical object, and a visual representation of 3D printed object.

5. The method of claim 1, wherein the 3D object is a 3D model of a user's face.

6. The method of claim 1, wherein the visual input comprises a plurality of images.

7. The method of claim 1, wherein the 3D object comprises a plurality of 3D objects.

8. The method of claim 1, wherein the visual input is at least one frame of a video.

9. The method of claim 1, wherein the visual input comprise at least a portion of one frame of a video.

10. The method of claim 1, wherein the visual input comprise at least a first portion of a first frame and a second portion of a second frame of a video.

11. A non-transitory computer readable medium having instructions stored thereon that, upon execution by a first computing device, cause the first computing device to perform operations comprising:
- obtaining a visual input;
- obtaining a private key;
- generating an encrypted visual representation based on the private key and the visual input, wherein the encrypted visual representation is generated by embedding the private key into the visual input;
- generating a three-dimensional (3D) visual representation by texture mapping the encrypted visual representation onto a digital model of at least one 3D object, wherein the digital model of the at least one 3D object comprises a collection of points in three-dimensional space;
- converting the 3D visual representation to a two-dimensional (2D) visual representation;
- transmitting the 2D visual representation to a second computing device;
- transmitting a representation of the digital model of the at least one 3D object to the second computing device; and
- wherein the second computing device is configured to:
  - receive the 2D visual representation;
  - obtain the representation of the digital model of the at least one 3D object;
  - un-warp the 2D visual representation using the digital model of the 3D object to generate the encrypted visual representation;
  - extract, based on the un-warping of the 2D visual representation using the digital model of the 3D object, the private key; and
  - decode, based on the private key, the encrypted visual representation to obtain the visual input.

12. The non-transitory computer readable medium of claim 11, wherein the visual input is an image.

13. The non-transitory computer readable medium of claim 11, wherein the visual input comprises a QR code.

14. The non-transitory computer readable medium of claim 11, wherein the 3D object is at least one of: a physical object, and a visual representation of 3D printed object.

15. The non-transitory computer readable medium of claim 11, wherein the 3D object is a 3D model of a user's face.

16. The non-transitory computer readable medium of claim 11, wherein the visual input comprises a random visual input.

17. The non-transitory computer readable medium of claim 11, wherein the visual input is at least one frame of a video.

18. The non-transitory computer readable medium of claim 11, wherein the visual input comprises at least a portion of one frame of a video.

19. A system comprising:
- one or more processors; and
- a memory in communication with the one or more processors and storing instructions that, when executed by the one or more processors, cause the one or more processors to:
  - obtain a visual input;
  - obtain a private key;
  - generate an encrypted visual representation based on the private key and the visual input, wherein the encrypted visual representation is generated by embedding the private key into the visual input;
  - generate a three-dimensional (3D) visual representation by texture mapping the encrypted visual representation onto a digital model of at least one 3D object, wherein the digital model of the at least one 3D object comprises a collection of points in three-dimensional space;
  - convert the 3D visual representation to a two-dimensional (2D) visual representation;
  - transmit the 2D visual representation to a second computing device;
  - transmit a representation of the digital model of the at least one 3D object to the second computing device; and
- wherein the second computing device is configured to:
  - receive the 2D visual representation;
  - obtain the representation of the digital model of the at least one 3D object;
  - un-warp the 2D visual representation using the digital model of the 3D object to generate the encrypted visual representation;
  - extract, based on the un-warping of the 2D visual representation using the digital model of the 3D object, the private key; and
  - decode, based on the private key, the encrypted visual representation to obtain the visual input.

\* \* \* \* \*